(12) United States Patent
Okada et al.

(10) Patent No.: US 8,402,236 B2
(45) Date of Patent: Mar. 19, 2013

(54) COMPUTER SYSTEM MANAGING VOLUME ALLOCATION AND VOLUME ALLOCATION MANAGEMENT METHOD

(75) Inventors: Wataru Okada, Machida (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 711 days.

(21) Appl. No.: 12/625,006

(22) Filed: Nov. 24, 2009

(65) Prior Publication Data

US 2011/0078395 A1 Mar. 31, 2011

(30) Foreign Application Priority Data

Sep. 30, 2009 (JP) ................................. 2009-225849

(51) Int. Cl.
*G06F 12/00* (2006.01)
(52) U.S. Cl. ...................................................... 711/162
(58) Field of Classification Search .................... None
See application file for complete search history.

(56) References Cited

U.S. PATENT DOCUMENTS

| | | | |
|---|---|---|---|
| 5,956,750 A | | 9/1999 | Yamamoto et al. |
| 6,170,037 B1 * | | 1/2001 | Blumenau ................ 711/114 |
| 7,284,103 B2 | | 10/2007 | Kaga et al. |
| 2003/0101318 A1 | | 5/2003 | Kaga et al. |
| 2009/0157768 A1 | | 6/2009 | Ichikawa et al. |
| 2009/0228670 A1 * | | 9/2009 | Nakagawa et al. ........... 711/162 |

FOREIGN PATENT DOCUMENTS

| | | |
|---|---|---|
| JP | 2000-293317 A | 10/2000 |
| JP | 2003-162378 A | 6/2003 |
| JP | 2009-151389 A | 7/2009 |

* cited by examiner

*Primary Examiner* — Hiep Nguyen
(74) *Attorney, Agent, or Firm* — Foley & Lardner LLP

(57) ABSTRACT

In a management computer which manages a storage system including a main logical volume and subsidiary logical volumes, when the access volume to the main logical volume exceeds a threshold value, a subsidiary logical volume associated with a physical volume having higher input/output performance than the physical volume associated with the main logical volume is selected. When the migration time of the data stored in the physical volume corresponding to the selected subsidiary logical volume is within a prescribed time period, then data stored in the physical volume corresponding to the main logical volume is migrated to the physical volume corresponding to the selected subsidiary logical volume, and the physical volume corresponding to the selected subsidiary logical volume is associated with the main logical volume.

15 Claims, 22 Drawing Sheets

FIG. 5

| APPLICATION ID | NORMAL REQUIRED PERFORMANCE | REQUIRED PERFORMANCE FOR DISASTER | TOLERABLE PERFORMANCE DETERIORATION TIME | SITE ID | NORMAL HOST ID | DISASTER HOST ID |
|---|---|---|---|---|---|---|
| AP01 | 550 IOPS | 550 IOPS | 120 SECONDS | Site01 | Host01 | Host11 |
| AP02 | 350 IOPS | 350 IOPS | 180 SECONDS | Site02 | Host02 | Host12 |
| AP03 | 350 IOPS | 350 IOPS | 600 SECONDS | Site02 | Host03 | Host13 |
| ... | ... | ... | ... | ... | ... | ... |

| STORAGE ID 6001 | LOGICAL VOL ID 6002 | PHYSICAL VOL ID 6003 | CAPACITY 6004 | USE STATUS 6005 | ATTRIBUTE 6006 | SITE ID 6007 |
|---|---|---|---|---|---|---|
| STG1 | LU01 | PG1 | 100G | AP01 | MAIN | Site01 |
| STG2 | LU02 | PG2 | 100G | AP01 | SUBSIDIARY | Site02 |
| STG2 | LU03 | PG3 | 100G | AP02 | MAIN | Site02 |
| STG2 | LU04 | PG4 | 100G | — | UNUSED | Site02 |
| STG2 | LU05 | PG5 | 100G | — | BUFFER | Site02 |
| ... | | | | | | ... |

FIG. 7

| STORAGE ID | PHYSICAL VOL ID | PERFORMANCE |
|---|---|---|
| STG1 | PG1 | 550IOPS |
| STG2 | PG2 | 550IOPS |
| STG2 | PG3 | 350IOPS |
| ... | ... | ... |

| STORAGE ID | DATA MIGRATION SPEED |
|---|---|
| STG1 | 400MB/s |
| STG2 | 400MB/s |
| ... | ... |

8001 / 8002

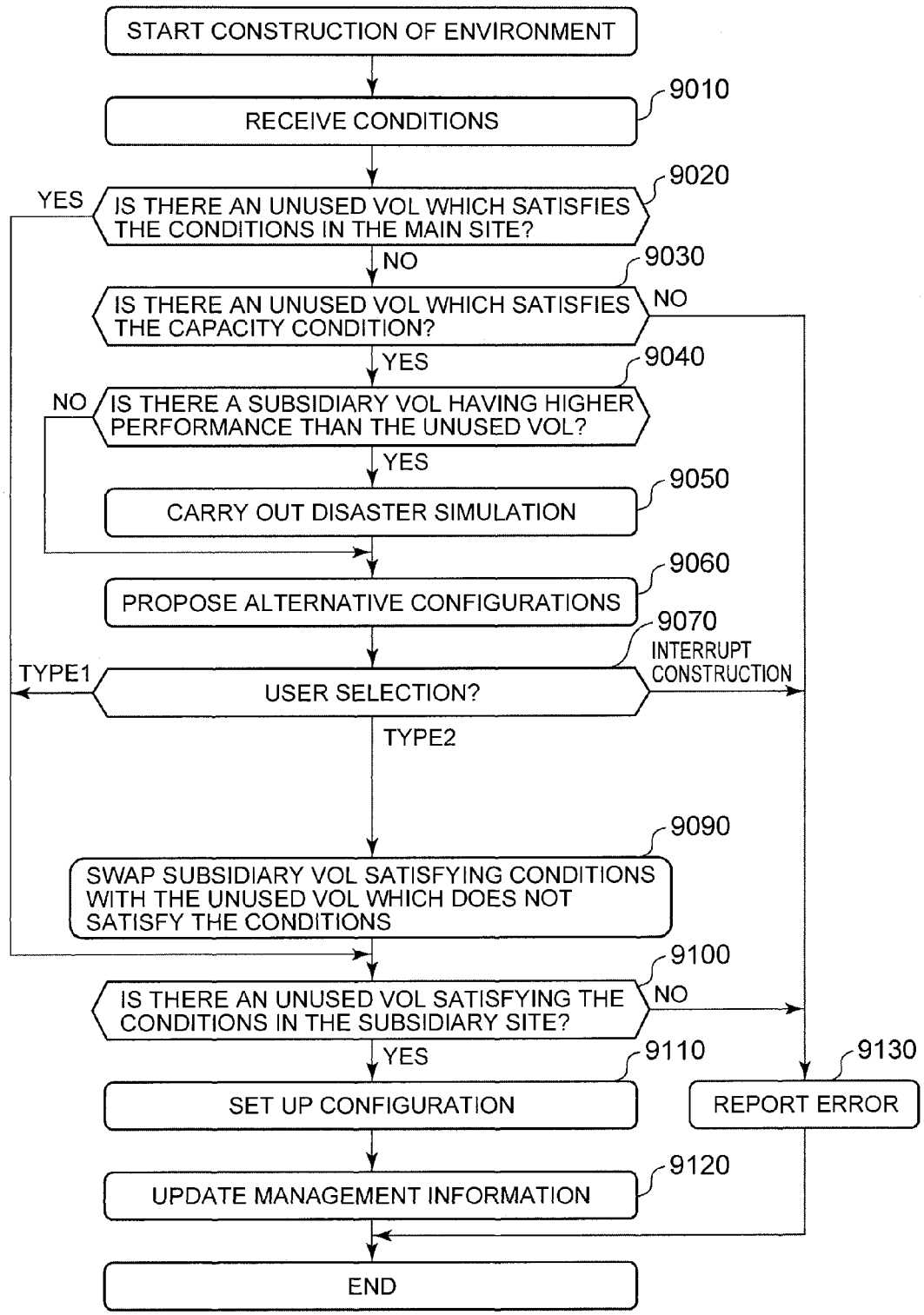

FIG. 10

ALTERNATIVE CONFIGURATION PROPOSAL SCREEN

PLEASE SELECT ONE OF THESE OPTIONS

10010 ○ TYPE 1 : PERMIT NON-ATTAINMENT OF NORMAL REQUIRED PERFORMANCE

500IOPS (REQUIRED PERFORMANCE)
300IOPS

NORMAL OPERATION | DISASTER IN OTHER SITE

10020 ○ TYPE 2 : PERMIT DECLINE IN PERFORMANCE ONLY IN THE EVENT OF DISASTER IN THE OTHER SITE
※ IT TAKES TIME UNTIL THE REQUIRED PERFORMANCE IS SATISFIED BY THE VOLUME ALLOCATED TO THE APPLICATION TRANSFERRED BY FAILOVER IN THE EVENT OF DISASTER.

500IOPS (REQUIRED PERFORMANCE)
300IOPS

NORMAL OPERATION | DISASTER IN OTHER SITE

10030 ○ DO NOT PERMIT ALTERNATIVE CONFIGURATION.
※ END CONSTRUCTION OF DISASTER RECOVERY CONFIGURATION.

10040 [ OK ]

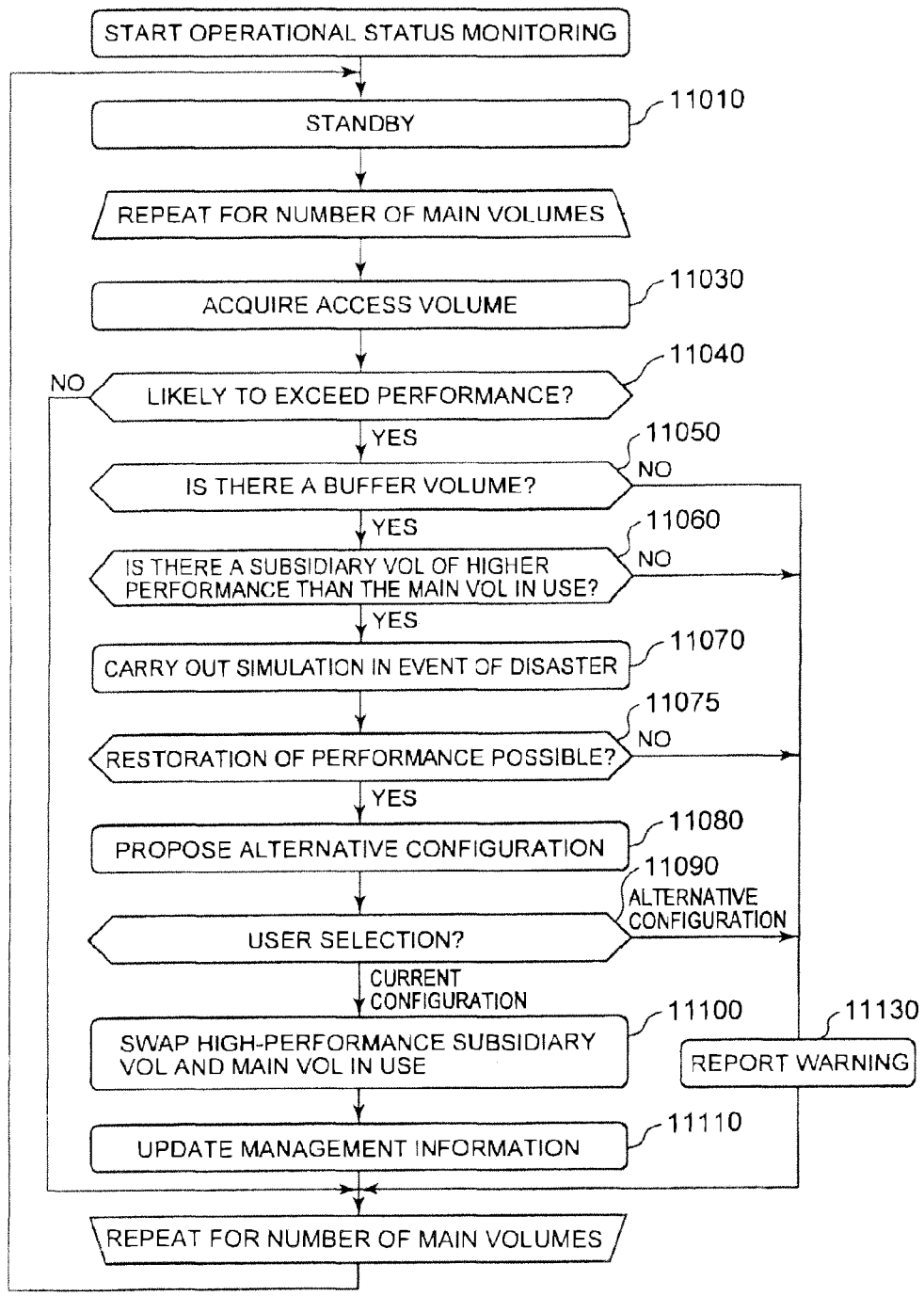

FIG. 16

| VM ID 16001 | NORMAL REQUIRED PERFORMANCE 5002 | REQUIRED PERFORMANCE FOR DISASTER 5003 | TOLERABLE PERFORMANCE DETERIORATION TIME 5004 | SITE ID 5005 | NORMAL PHYSICAL SERVER ID 16002 | DISASTER PHYSICAL SERVER ID 16003 |
|---|---|---|---|---|---|---|
| VM01 | 550 IOPS | 550 IOPS | 120 SECONDS | Site01 | HV01 | HV11 |
| VM02 | 350 IOPS | 350 IOPS | 180 SECONDS | Site02 | HV02 | HV12 |
| VM03 | 350 IOPS | 350 IOPS | 600 SECONDS | Site02 | HV03 | HV13 |
| ⋮ | ⋮ | ⋮ | ⋮ | ⋮ | ⋮ | ⋮ |

FIG. 17

| STORAGE ID 6001 | LOGICAL VOL ID 6002 | CAPACITY 6004 | USE STATUS 6005 | ATTRIBUTE 6006 | SITE ID 6007 | USED CAPACITY 17001 |
|---|---|---|---|---|---|---|
| STG1 | LU01 | 100G | HV01 | MAIN | Site01 | 0GB |
| STG2 | LU02 | 100G | HV02 | SUBSIDIARY | Site02 | 0GB |
| STG2 | LU03 | 100G | HV02 | MAIN | Site02 | 0GB |
| STG2 | LU04 | 100G | — | UNUSED | Site02 | 0GB |
| STG2 | LU05 | 100G | — | BUFFER | Site02 | 0GB |
| ... | ... | ... | ... | ... | ... | ... |

FIG. 18

| STORAGE ID | LOGICAL VOL ID | START ADDRESS | END ADDRESS | Pool ID |
|---|---|---|---|---|
| STG1 | LU01 | 0x00ff | 0x09ff | Pool1 |
| STG1 | LU01 | 0x10ff | 0x19ff | Pool2 |
| ... | ... | ... | ... | ... |

| STORAGE ID | Pool ID | PERFORMANCE | CAPACITY | USED CAPACITY |
|---|---|---|---|---|
| STG1 | Pool1 | 550IOPS | 10TB | 4TB |
| STG2 | Pool2 | 550IOPS | 20TB | 2TB |
| STG2 | Pool3 | 350IOPS | 10TB | 0TB |
| ... | ... | ... | ... | ... |

| VM ID 20001 | ALLOCATED MEMORY VOLUME 20002 | ALLOCATED DATA INTERFACE PERFORMANCE 20003 | STORAGE ID 20004 | LOGICAL VOLUME ID 20005 | LOGICAL VOLUME ADDRESS 20006 |
|---|---|---|---|---|---|
| VM01 | 1024 MB | 550 IOPS | STG1 | LU01 | 0x00ff~0x09ff, 0x0aff~0x0fff |
| VM02 | 1024 MB | 500 IOPS | STG1 | LU02 | 0x10ff~0x19ff, 0x1aff~0x1fff |
| VM03 | 2048 MB | 300 IOPS | STG1 | LU03 | 0x20ff~0x29ff, 0x2aff~0x2fff |
| ... | ... | ... | ... | ... | ... |

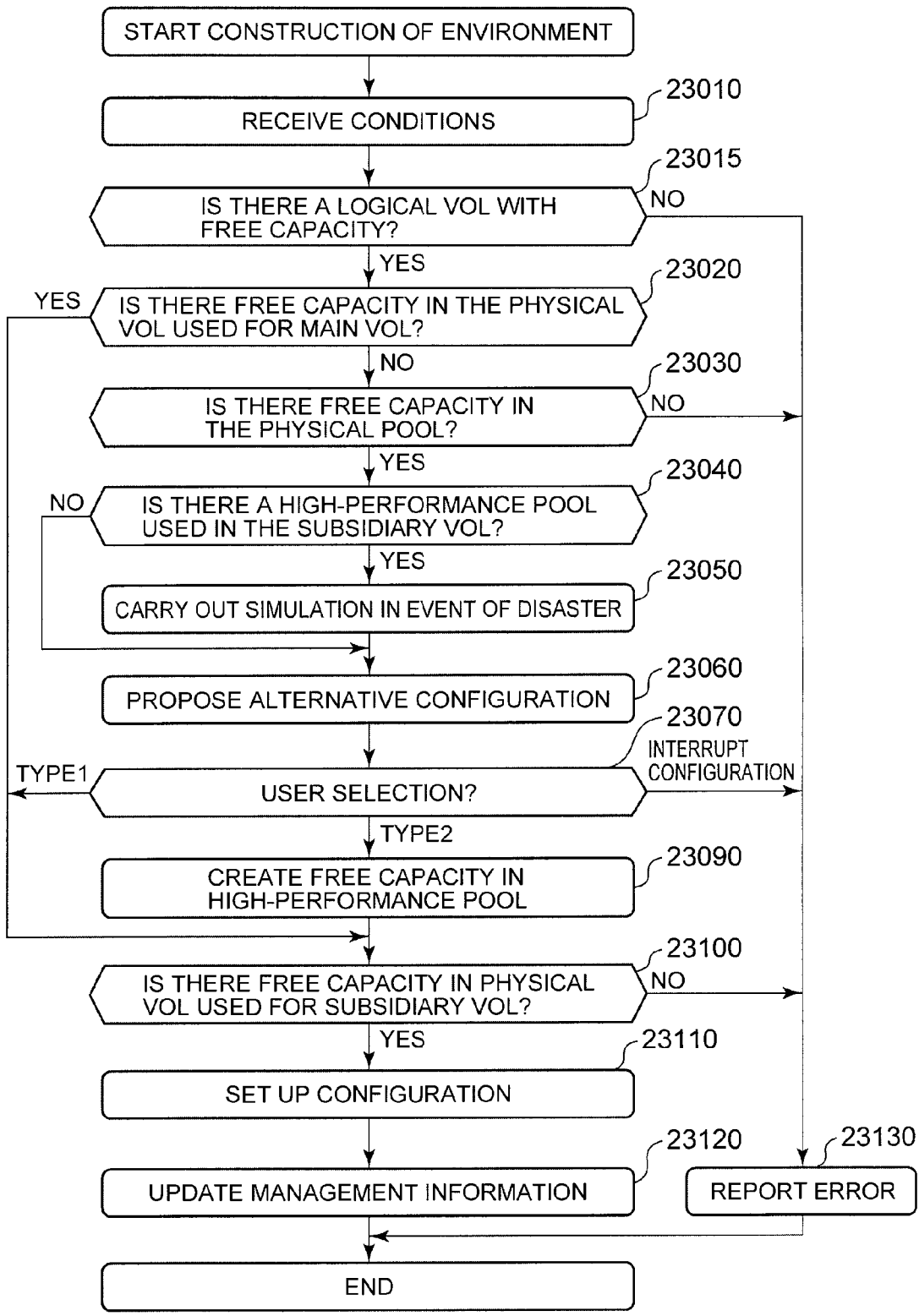

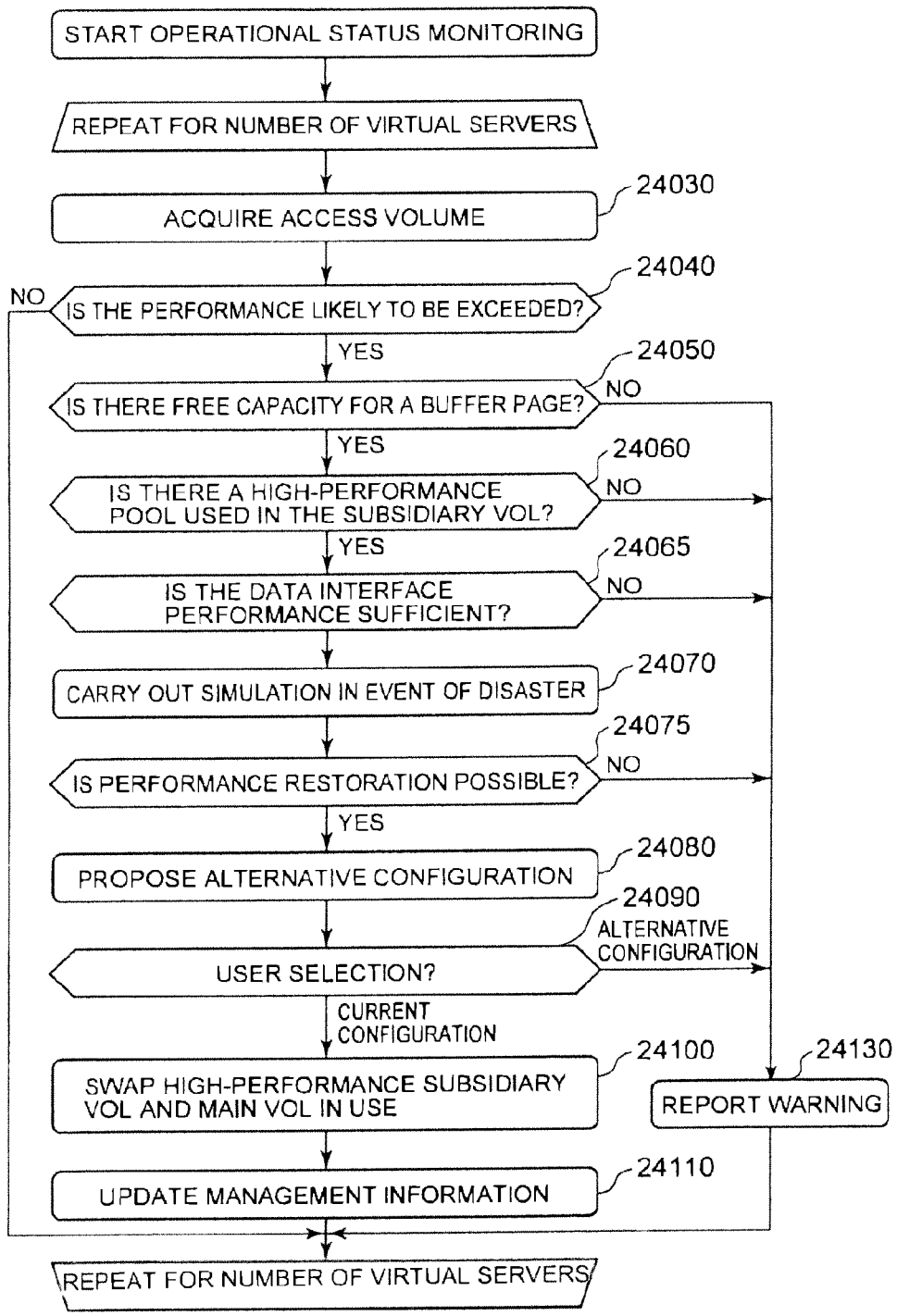

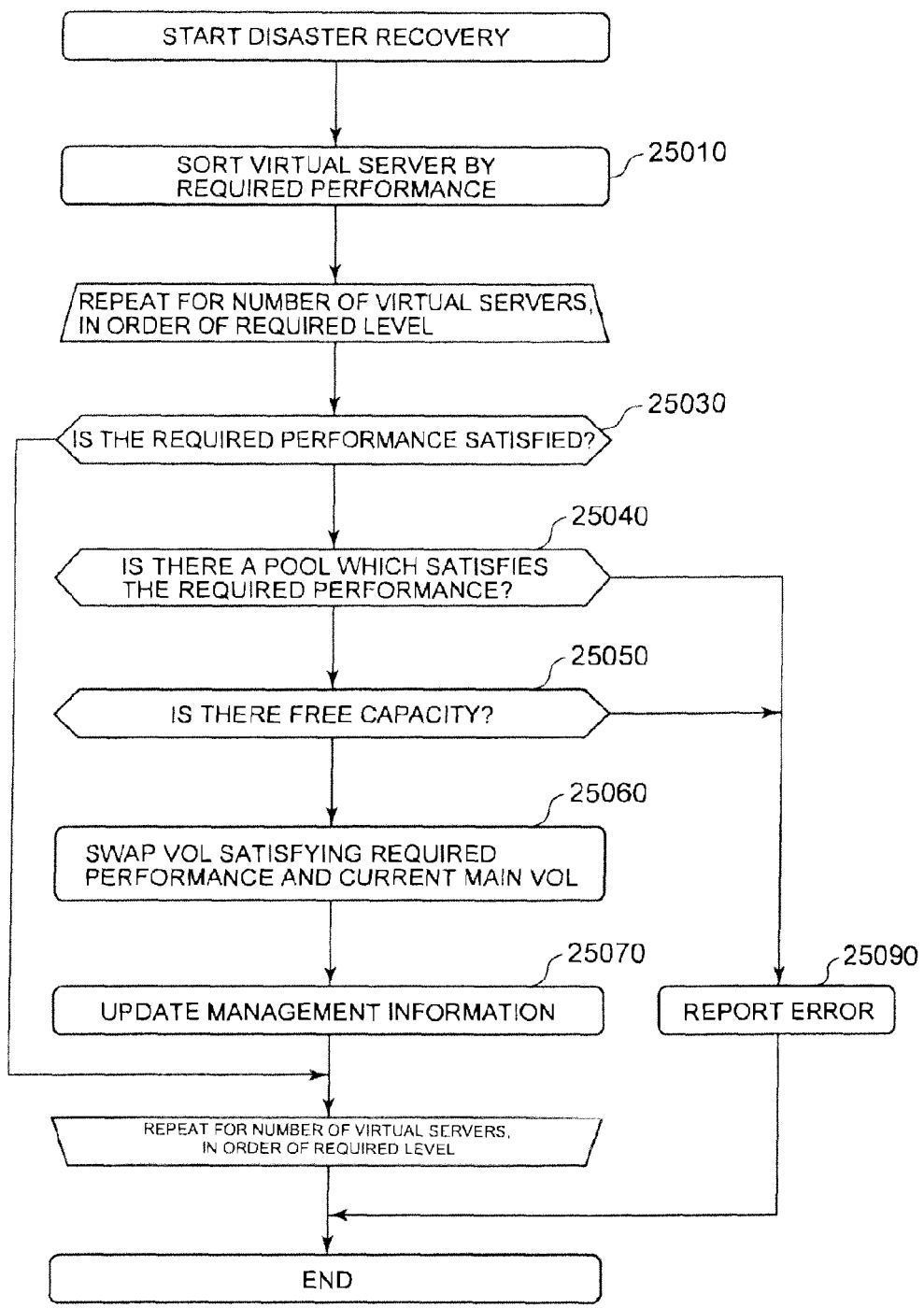

COMPUTER SYSTEM MANAGING VOLUME ALLOCATION AND VOLUME ALLOCATION MANAGEMENT METHOD

CROSS-REFERENCE TO PRIOR APPLICATION

This application relates to and claims the benefit of priority from Japanese Patent Application number 2009-225849, filed on Sep. 30, 2009 the entire disclosure of which is incorporated herein by reference.

BACKGROUND

The present invention generally relates to a computer system for managing volume allocation and to a volume allocation management method, and more particularly, to technology for managing the allocation of physical volumes to main and subsidiary logical volumes in a computer system employing a disaster recovery configuration.

With the digitalization of information, the volume of business data held by computer systems has increased. The loss of business data hampers the continuation of a company's business activities and damages trust in the company, and therefore is a major issue for the company's livelihood. However, the risk of loss of business data always exists, whether through natural disaster, such as an earthquake, or due to terrorist action, or the like. In order to reduce this risk, there are increasing numbers of cases where a disaster recovery configuration is employed in computer systems. Disaster recovery means a configuration whereby a duplicate copy of business data is created in a remote location, on a constant basis during operation, and business can be continued at the remote location using the data copy, in the event of loss of the business data. For example, Japanese Patent Application Publication No. 2009-151389 discloses technology for constructing a disaster recovery configuration using a data duplication function (remote copying function) between frames belonging to a storage system.

Furthermore, in a computer system which duplicates business data on a constant basis during operation, access from a host computer is generally made to the duplication source volume (main logical volume), and therefore the load on this volume is higher than on the duplication destination volume (subsidiary logical volume). For this reason, if the main logical volumes of a plurality of host computers share the same storage apparatus, then the load on that storage apparatus increases. Japanese Patent Application Publication No. 2003-162378 discloses a storage system which generates a plurality of logical volumes from a single physical volume. Japanese Patent Application Publication No. 2003-162378 discloses technology which implements control whereby, in order to avoid increase in the load on a particular physical volume, if a first host computer uses a logical volume that has been generated from a first physical volume as a main logical volume and uses a logical volume that has been generated from a second physical volume as a subsidiary logical volume, then the second host computer uses the logical volume generated from the second physical volume as a main logical volume and uses the logical volume generated from the first physical volume as a subsidiary logical volume.

As an extension of this technology, in order to distribute the load in a disaster recovery configuration as well, in general, a configuration is adopted in which, if a first host computer uses a logical volume stored by a first storage system as a main logical volume and uses a logical volume stored by a second storage system as a subsidiary logical volume, then a second host computer uses a logical volume stored by the second storage system as a main logical volume and uses a logical volume stored by the first storage system as a subsidiary logical volume. In general, this is called an active-active disaster recovery configuration.

SUMMARY

An object of the disaster recovery configuration disclosed in Japanese Patent Application Publication No. 2009-151389 is to restart business operations in a subsidiary site which stores a remote copy of data from a main site where business operations are carried out, in the event of the main site suffering a disaster. The business operations restarted in the subsidiary site by using the remotely copied data in the event of a disaster must satisfy the same performance targets as those applicable during normal operation. Conventionally, in order to satisfy the performance targets required by the user in the event of a disaster, in the storage apparatus of a subsidiary site, the remotely copied data is stored in a subsidiary logical volume which satisfies the performance targets and the data is allocated to business operations. For example, if there is a need to continue business operations with the same level of performance as normal operation, in the event of a disaster, then a volume having the same performance as the main logical volume is allocated to business operations as a subsidiary logical volume.

On the other hand, the number of high-performance volumes in the storage apparatus is restricted by limitations of various types. When a high-performance subsidiary logical volume is used for particular business operations, then there are cases where a main logical volume having lower than required performance inevitably has to be allocated to other business operations. However, the host computer does not access the subsidiary logical volumes during normal operation. Consequently, there is a problem in that during normal operation, it is not possible to utilize the performance of high-performance subsidiary logical volumes which have been allocated in order to satisfy performance targets for business operations which are restarted in the event of disaster.

A computer system which solves the problems described above is a computer system has: a storage system which is coupled to another storage system; and a management computer which manages the storage system, wherein the storage system has: a plurality of physical volumes corresponding to a plurality of logical volumes including a first main logical volume, a plurality of first subsidiary logical volumes and a buffer volume; and a first controller which executes data input/output processing to and from the plurality of first physical volumes, the management computer has: a memory which stores physical volume information indicating performance of the plurality of physical volumes; and a second controller which executes processing by referring to data stored in the memory, and the plurality of first subsidiary logical volumes form copy pairs with a plurality of second main logical volumes provided by the other storage system, the first main logical volume forms a copy pair with a second subsidiary logical volume provided by the other storage system, when the access volume to the first main logical volume exceeds a threshold value, the second controller selects a subsidiary logical volume which is included in the plurality of first subsidiary logical volumes, and which is associated with a second physical volume having higher input/output performance than a first physical volume associated with the first main logical volume, by referring to the physical volume information read out from the memory, and the second controller confirms whether the migration time of the data stored in the second physical volume corresponding to the selected subsidiary logical volume is within a prescribed time period, and when the migration time is within the prescribed time period, instructs the storage system to migrate data stored in the second physical volume corresponding to the selected subsidiary logical volume to a third physical volume which corresponds to the buffer volume, and to migrate data stored in the first physical volume corresponding to the first main logical volume to the second physical volume corresponding to the selected subsidiary logical volume, and to associate the second physical volume corresponding to the selected subsidiary logical volume with the first main logical volume.

If the physical volume corresponding to the main logical volume in the storage system does not satisfy the business performance required by the server, then the physical volume corresponding to a logical volume which is a high-performance subsidiary logical volume and which is not in use because operation is normal can be allocated to the main logical volume and utilized, thereby making it possible to use the physical volumes in the storage system efficiently.

BRIEF DESCRIPTION OF THE DRAWINGS

FIG. 5 is a diagram showing an example of the configuration of application information according to the first embodiment;

FIG. 6 is a diagram showing an example of the configuration of logical volume information according to the first embodiment;

FIG. 7 is a diagram showing an example of the configuration of physical volume information 4015 according to the first embodiment;

FIG. 8 is a diagram showing an example of the configuration of data migration performance information 4016 according to the first embodiment;

FIG. 9 is a diagram showing the flow of processing carried out when the configuration construction program 4010 constructs a disaster recovery configuration according to the first embodiment;

FIG. 10 is a diagram showing an example of the configuration of an alternative configuration proposal screen according to the first embodiment;

FIG. 11 is a flowchart showing the operation of the operational status monitoring program in the first embodiment;

FIG. 16 is a diagram showing an example of the configuration of a table of VM performance information in the second embodiment;

FIG. 17 is a diagram showing an example of the configuration of a table of logical volume information in the second embodiment;

FIG. 18 is a diagram showing an example of the configuration of a table of logical volume configuration information in the second embodiment;

FIG. 19 is a diagram showing an example of the configuration of a table of physical volume information in the second embodiment;

FIG. 20 is a diagram showing an example of the configuration of a table of VM configuration information in the second embodiment;

FIG. 23 is a flowchart showing the operation of the configuration construction program in the second embodiment;

FIG. 24 is a flowchart showing the operation of the operational status monitoring program in the second embodiment; and FIG. 25 is a flowchart showing the operation of the disaster recovery program in the second embodiment.

DETAILED DESCRIPTION OF THE EMBODIMENT

Below, embodiments of the present invention are described in detail with reference to the drawings.

(First Embodiment)

To begin with, a first embodiment will be described.

Below, the system configuration and operation of the present embodiment will be described.

(1-1) System Configuration According to First Embodiment

Figure 1:
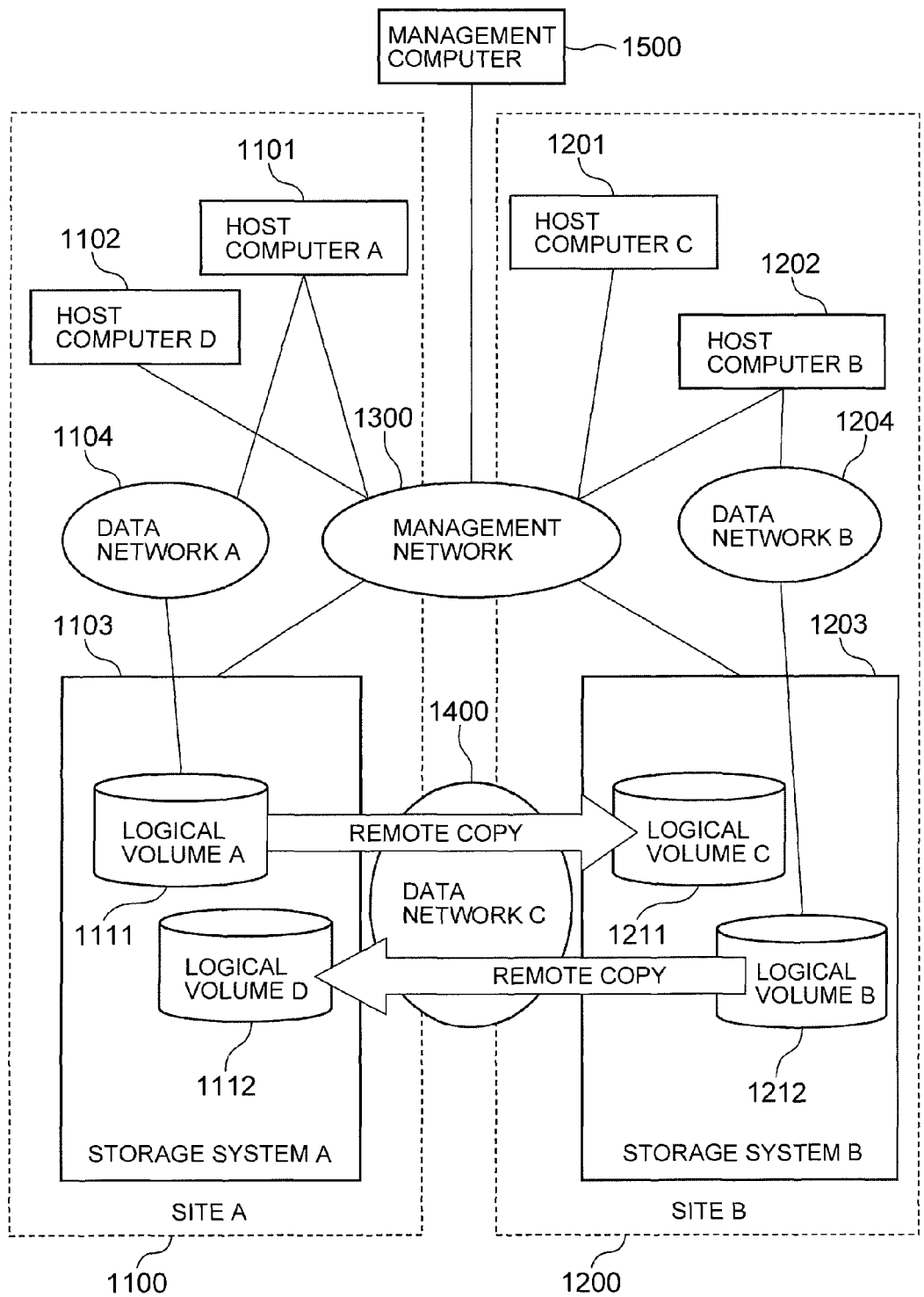
FIG. 1 is a block diagram showing an overview of the configuration of a computer system in a first embodiment.

FIG. 1 is one example of a block diagram showing an overview of the configuration of a computer system according to the present embodiment.

The present system has an active-active disaster recovery configuration based on a site A1100 and a site B1200.

This computer system includes a host computer A1101 in site A1100 and a host computer B1202 in site B1200, as operating system host computers (main host computers) which run applications during normal operation. In the event of a disaster in site A1100, a host computer C1201 is included in the site B1200 as a standby system host computer (subsidiary host computer) which runs an application equivalent to that of the host computer A1101. Moreover, in the event of a disaster in site B1200, a host computer D1102 is included in the site A1100 as a standby host computer (subsidiary host computer) which runs an application equivalent to that of the host computer B1202. Here, it is desirable that the standby host computer should have a configuration that is equivalent to that of the corresponding operating system host computer. However, the standby host computer may have a different configuration, provided that this configuration allows the operation, in the event of a disaster, of an application that is equivalent to the application run by the operating system host computer.

A storage system A1103 is included in the site A1100, in addition to the host computer A1101 and the host computer D1102. The storage system A1103 of the site A1100 is connected to the storage system 1203 of the site B1200 via a data network C1400.

Furthermore, the host computer A1101 issues data read and write requests in relation to the logical volume A1111 included in the storage system A1103 via the data network A1104. The storage system A1103 executes a control program (remote copying program) held in that storage system A1103, by means of a CPU, and duplicates (remotely copies) the data stored in the logical volume A1111 to the logical volume C1211 of the storage system B1200, via the data network C1400. In the event of a disaster in site A1100, the host computer C1201 presents to the user an application equivalent to the application which was running in the host computer A, using the data in the logical volume C1211, thereby making it possible to recover from the disaster. Physical volumes are associated with the logical volumes. Data reading and writing processes from and to a logical volume are actually reading and writing processes in relation to the physical volume which is associated with the logical volume. Below, there may be mention of "a data reading and writing process in relation to a logical volume", but this means "a data reading and writing process in relation to the physical volume associated with the logical volume".

A storage system B1203 is included in the site B1200, in addition to the host computer B1202 and the host computer C1201. The storage system B1203 is connected to the storage system A1103 via the data network C1400. Furthermore, the host computer B1202 issues data read and write requests in relation to the logical volume B1212 of the storage system 1200, via the data network B1204. The storage system B1203 duplicates (remotely copies) the data in the logical volume B1212 to the logical volume D1112, via the data network C1400, by means of a control program (remote copying program) held by the storage system B1203. In the event of a disaster in the site B1200, the host computer D1102 is able to recover an application equivalent to the application that was running on the host computer B, by using this logical volume D1112.

The computer system includes a management computer 1500. The management computer 1500 is connected via a management network 1300 to the operating system host computers, standby system host computers and storage systems of the respective sites. The management computer 1500 manages the operating system host computers, the standby system host computers and the storage systems of the respective sites.

In this configuration diagram of the computer system, one storage system and two host computers are provided in each site. However, the configuration is not limited to this, and the present computer system may also include a plurality of storage systems and two or more host computers. Furthermore, the data network A1104, the data network B1204 and the data network C1400 are storage area networks (SAN). However, the networks are not limited to this, and may also be IP networks, or data communications networks other than this. Furthermore, the management network 1300 is an IP network. However, the management network is not limited to this, and may by a storage area network or a data communications network other than this. Furthermore, if the respective networks are the same network, then two or more of the host computer A1101, the host computer D1102 and the management computer 1500 may be realized by means of a single computer. Similarly, two or more of the host computer 31202, the host computer C1201 and the management computer 1500 may be realized by means of a single computer.

Figure 2:
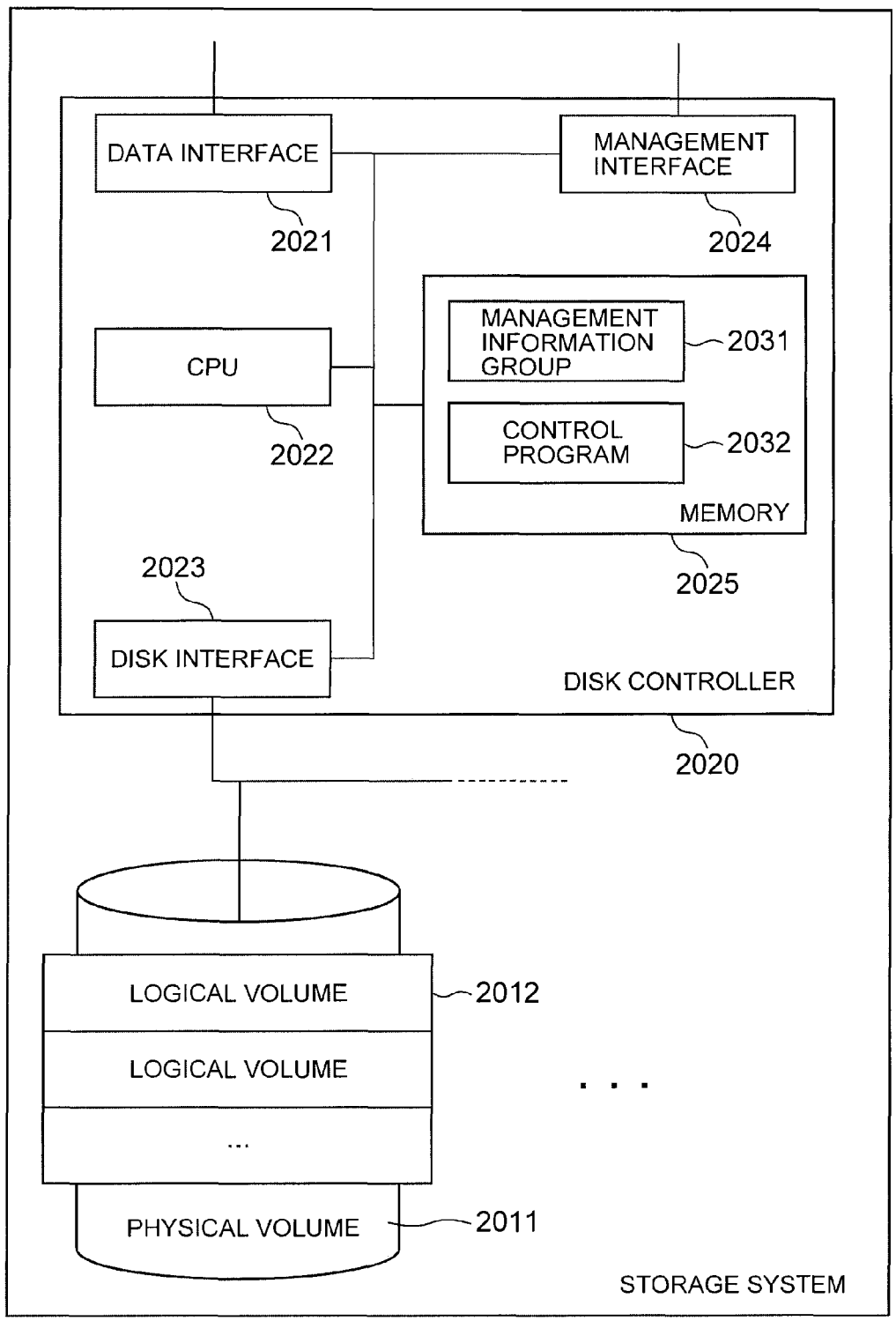
FIG. 2 is a diagram showing one example of the configuration of the storage system according to the first embodiment.

FIG. 2 is a diagram showing one example of the configuration of the storage system A1103 in the present embodiment.

The storage system A1103 is a storage system which presents logical volumes for storing data used by an application of a host computer. The storage system A1103 comprises a physical volume 2011 which stores data and a disk controller 2020 which performs internal control of the storage system A1103.

The physical volume 2011 is a disk type storage apparatus, for example, a hard disk drive (HDD). The physical volume 1011 may also be a storage apparatus of many types, such as a flash memory device.

The disk controller 2020 includes a data interface 2021, a management interface 2024, a disk interface 2023, a memory 2025 and a CPU 2022.

A management information group 2031 and a control program 2032 are stored in the memory 2025. The CPU 2022 executes the control program 2032 stored in the memory 2025. Below, if a computer program is the subject of an action, then this actually refers to a process which is carried out by the CPU executing that computer program.

The control program 2032 creates and manages areas formed by the dividing the physical volume 2011 logically into one or more areas. The areas formed by this division are logical volumes 2012. FIG. 2 shows logical volumes 2012 which are created from one physical volume 2011. However, instead of this, it is also possible to create logical volumes 2012 from a plurality of physical volumes 2011 which are grouped by means of RAID (Redundant Array of Inexpensive Disks) technology.

Furthermore, the control program 2032 executes processing required to remotely copy the data stored in a logical volume 2012, to the storage system 1203. For example, the control program records in the management information group 2031 a set comprising the identifier of a logical volume 2012 that is to be a main logical volume and the identifier of a logical volume 2012 in another frame that is to be a subsidiary logical volume, in accordance with the instructions of the user. The control program 2032 copies the data of the main logical volume to the subsidiary logical volume, in collaboration with the control program of the storage system which stores the subsidiary logical volume. Thereupon, processing is carried out, such as receiving a writing operation from a host computer to a main logical volume, and transferring the data to be written, to the subsidiary logical volume, and the like.

Furthermore, the control program 2032 executes processing for relocating the data stored in the physical volume 2011, to another physical volume. More specifically, the control program 2032 copies the data stored in the area of the physical volume corresponding to a designated logical volume area, to an area of another physical volume. The control program 2032 relocates the data between the physical volumes, without affecting the host computers, by re-associating the designated logical volume area with the area of the physical volume that is the copy destination. The details of this technology are similar to those disclosed in Japanese Patent Application Publication No. 2000-293317. Here, the relocation of data is called "data migration".

Furthermore, the control program 2032 also carries out data input/output (write/read) processing to and from a logical volume 2012, in accordance with requests from the management computer or a host computer. The control program 2032 sets up the configuration information and control information inside the storage system 1000. Here, the relationship between the physical volume 1011 and the logical volumes 2012 is included in the configuration information. The configuration information is recorded in the memory 2025 as all or a portion of the management information group 2031. In executing the various processes described above, the control program 2032 described above refers to and updates the configuration information contained in the management information group 2031.

The data interface 2021 is an interface which connects with the data network A1104 or the data network C1400. The control program 2032 sends and receives data and control commands to and from the host computer and another storage system via a data interface 2021.

The management interface 1022 is an interface which is connected to the management network 1300. The control program 2032 sends and receives data and control commands to and from the host computer and the management computer via a management interface 2024.

The disk interface 2023 is an interface which is connected to the physical volume 2011. The control program 2032 sends and receives data and control commands to and from the physical volume 2011, via a disk interface 2024.

The storage system B1203 also has a similar configuration to this and therefore further description thereof is omitted here.

Figure 3:
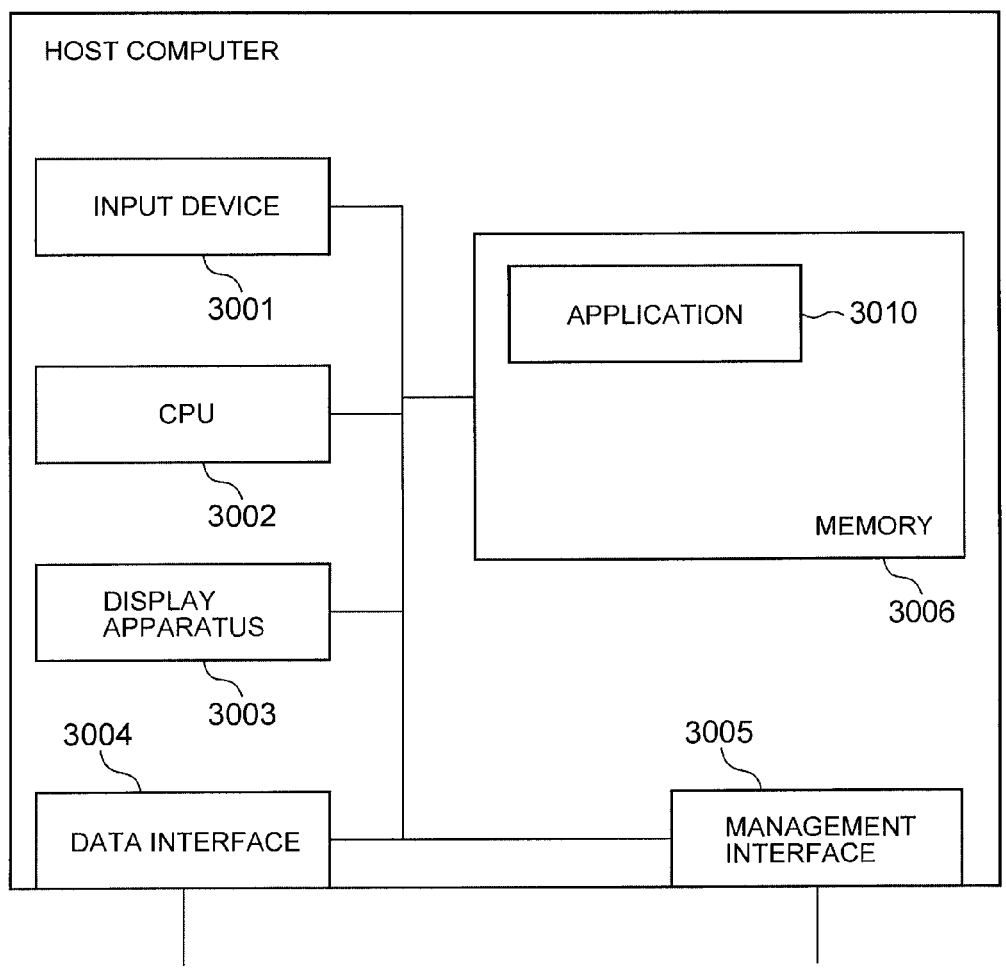
FIG. 3 is a diagram showing one example of the configuration of the host computer according to the first embodiment.

FIG. 3 is a diagram showing one example of the configuration of the host computer A1101 according to the present embodiment.

The host computer A1101 comprises an input device 3001, such as a keyboard or mouse, a CPU 3002, a display apparatus 3003 such as a CRT, a memory 3006, a data interface 3004, and a management interface 3005.

The CPU 3002 executes a program, such as an application 3010, stored in the memory 3006. The application 3010 is stored in the memory 3006. The application 3010 is an application program which uses the logical volumes 2012, and is, for example, a DBMS or file system. The data interface 3004 is an interface which is connected to the data network 1104. The application 3010 sends and receives data and control commands to and from the storage system via a data interface 3004.

The management interface 3005 is an interface to the management network 1400. The application 3010 sends and receives data and control commands to and from the management computer, and other host computers and storage systems, via a management interface 3005.

The host computer B1202, the host computer C1201 and the host computer D1102 also have a similar configuration to this and therefore further description thereof is omitted here. Furthermore, the applications stored in the memory of the host computer A include the applications stored in the memory of the host computer C. The applications stored in the memory of the host computer B include the applications stored in the memory of the host computer D.

Figure 4:
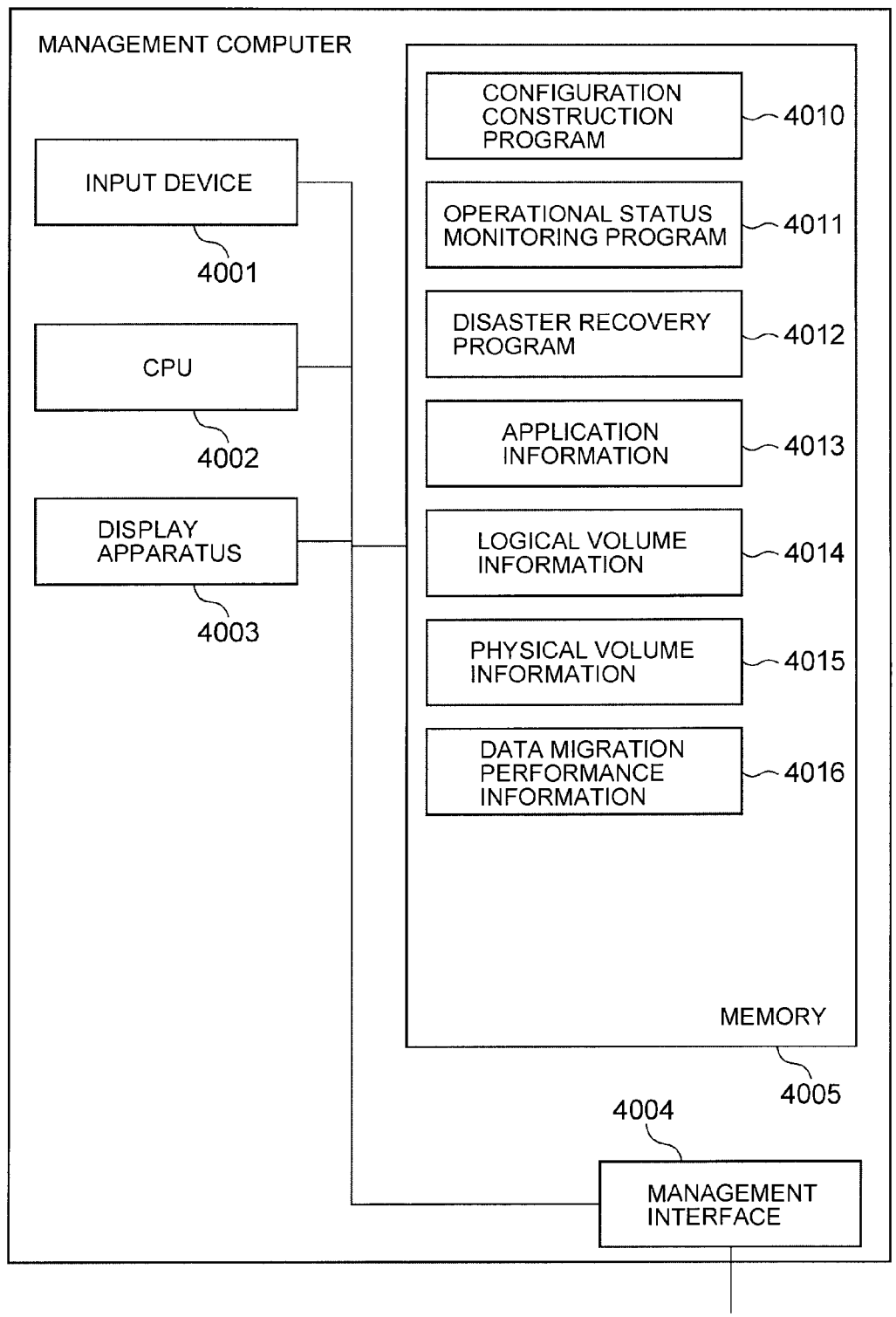
FIG. 4 is a diagram showing one example of the configuration of a management computer according to the first embodiment.

FIG. 4 is a diagram showing one example of the configuration of the management computer 1500 according to the present embodiment.

The management computer 1500 comprises an input device 4001, such as a keyboard or mouse, a CPU 4002, a display apparatus 4003 such as a CRT, a memory 4005, and a management interface 4004.

The memory 4005 stores: a configuration construction program 4010, an operational status monitoring program 4011, a disaster recovery program 4012, application information 4013, logical volume information 4014, physical volume information 4015, and data migration performance information 4016. The CPU 4002 executes the programs stored in the memory 4005. Below, in some cases, a program is described as the subject of the operation, but in actual practice, this means that the CPU 4002 reads out the program from the memory and executes the program.

The configuration construction program 4010 is a program for constructing a disaster recovery configuration. The user inputs settings information relating to the disaster recovery configuration to be constructed, by employing a user interface presented by the program. The flow of processing in this program is described hereinafter.

The operational status monitoring program 4011 monitors the state of access to the main logical volume in the disaster recovery environment during operation, and if the performance of the main logical volume is insufficient, migrates the data of the main logical volume to another volume, in accordance with an instruction from a user. After being started up by the user, this program continues to operate as a daemon process in the computer system. The flow of processing in this program is described hereinafter.

The disaster recovery program 4012 is a program for allocating volumes having the performance required by respective applications, in the event of a disaster. This program is started up by an instruction from the user. The flow of processing in this program is described hereinafter.

The application information 4013, logical volume information 4014, physical volume information 4015 and data migration performance information 4016 are described hereinafter.

FIG. 5 is a diagram showing one example of the configuration of application information 4013 according to the present embodiment.

The application ID 5001 stores an ID for uniquely identifying an application in the computer system. The following fields store information relating to the application identified by this value.

The normal required performance 5002 stores the processing performance of a logical volume required by the application during normal operation. The processing performance of the logical volume means the processing performance of the physical volume corresponding to the logical volume. Below, the "processing performance of the logical volume" means the "processing performance of the physical volume corresponding to the logical volume". In the present configuration example, the performance is represented by IOPS, which is the possible number of I/O actions in one second, but another format may be employed. Below, this value is called the normal required performance.

The required performance for disaster 5003 stores the logical volume processing performance required by the application when processing is restarted on another site in the event of a disaster. In the present configuration example, the performance is represented in terms of IOPS, which is the possible number of I/O actions in one second, but another format may be employed. Below, this value is called the required performance for disaster.

The tolerable performance deterioration time 5004 stores the tolerable time period until the completion of migration to a logical volume having the specified required performance for disaster, in the event of a disaster. In the present embodiment, this time may be expressed as a number of seconds, or in another format. Below, this value is called the tolerable performance deterioration time in event of disaster or the tolerable performance deterioration time. Furthermore, the time period until completing the migration to the logical volume having the specified required performance for disaster is called the performance deterioration time in event of disaster.

The site ID 5005 stores an ID for uniquely identifying the site to which the host computer running the application during normal operation belongs, in the computer system.

The normal host ID stores an ID for uniquely identifying, within the computer system, the host computer running the application during normal operation.

The disaster host ID stores an ID for uniquely identifying, within the computer system, the host computer running the application in the event of disaster.

These information elements are set by the configuration construction program 1251 on the basis of inputs made by the user. Furthermore, the method of utilizing, setting and changing these information elements is described hereinafter.

FIG. 6 is a diagram showing one example of the configuration of the logical volume information according to the present embodiment.

The storage ID 6001 stores an ID for uniquely identifying the storage system in the computer system.

The logic VOL ID 6002 stores an ID for uniquely identifying the logical volume of the storage system indicated by the storage ID 6001. The fields below store information relating to the logical volume indicated by the storage ID 6001 and the logic VOL ID 6002.

The physical volume 6003 stores an ID for uniquely identifying the physical volume associated with the logical volume.

The capacity 6004 stores the capacity of the logical volume.

The use status 6005 stores the use status of the logical volume. When the logical volume is in use, this field stores the application ID which is in use.

The attribute 6006 stores the attribute of the logical volume. If an application ID is stored in the use status 6005, then this field stores a text string indicating whether the volume is used as a main logical volume or is used as a subsidiary logical volume. Furthermore, if the volume is specified as a buffer volume, then this field stores a text string indicating a buffer volume. The method of using a buffer volume is described hereinafter. If the volume is an unused volume, a text string indicating an unused status is stored.

The site ID 6007 stores the ID of the site to which the storage system and the logical volume belong.

The storage ID 6001, the logical volume VOL ID 6002, the physical VOL ID 6003 and the volume 6004 are acquired from the control program 2032 of the storage system by the configuration construction program 4010 of the management computer via the management network 1300. This acquisition process is evident to any technician familiar with the field relating to the present invention and therefore description thereof is omitted here.

A logical volume having an attribute of "main" (a main logical volume) and a logical volume having an attribute of "subsidiary" (subsidiary logical volume) which are used by the same application indicates that the volumes form a remote copy pair.

The use status 6005, attribute 6006 and site ID 6007 are set by the configuration construction program 4010 on the basis of inputs made by the user. The use status 6005 stores a "-" (hyphen) indicating an unused status, as an initial value. The attribute 6006 stores a text string indicating an unused status, as an initial value. If the logical volume is designated as a buffer volume, then by starting up the configuration construction program 1251 and inputting an instruction designating the ID of the logical volume in question and the buffer volume, a test string indicating a buffer volume is stored in the corresponding attribute 6006. The method of setting values indicating use statuses other than a buffer volume status and unused status is described hereinafter. Furthermore, if a site ID is registered in the site ID 6007, then by starting up the configuration construction program 4010 and inputting the ID of the logical volume in question and the site ID, the input site ID is registered as the corresponding site ID 6007.

FIG. 7 is a diagram showing one example of the configuration of the physical volume information 4015 according to the present embodiment.

The storage ID 7001 stores an ID for uniquely identifying the storage system in the computer system.

The logic VOL ID 7002 stores an ID for uniquely identifying the physical volume in the storage system indicated by the storage ID 4001.

The performance 4003 stores the performance of the physical volume indicated by the physical VOL ID 4003. In the present configuration example, the performance is represented in terms of IOPS, which is the possible number of I/O actions in one second, but another format may be employed. As stated previously, the performance of a logical volume is the performance of the physical volume corresponding to that logical volume. Furthermore, if a logical volume is formed by the storage area of a plurality of physical volumes, then the performance of the logical volume is the performance of the physical volume having the lowest performance of this plurality of physical volumes.

These information elements are acquired by the configuration construction program 4010 of the management computer from the control program 2032 of the storage system, via the management network 1300. This acquisition process is evident to any technician familiar with the field relating to the present invention and therefore description thereof is omitted here.

FIG. 8 is a diagram showing one example of the configuration of the data migration performance information 4016 according to the present embodiment.

The storage ID 8001 stores an ID for uniquely identifying the storage system in the computer system.

The data migration speed 8002 stores the speed at which data migration is executed by the CPU inside the storage system indicated by the storage ID 8001. In the present embodiment, the data volume (bandwidth) which can be migrated in one second is indicated, but a format other than this may be used.

FIG. 9 is a diagram showing the flow of processing carried out when the configuration construction program 4010 constructs a disaster recovery configuration according to the present embodiment.

Firstly, when the configuration construction program 4010 is started up, conditions are received from the user by means of an input device of the management computer (step 9010). These conditions are: (a) application ID, (b) volume capacity, (c) normal required performance, (d) required performance for disaster, (e) tolerable performance deterioration time in event of disaster, (f) ID of site where application is run during normal operation, (g) ID of host computer which normally runs application, and (h) the ID of the host computer which runs the application in the event of a disaster.

Upon receiving an input from the user, the configuration construction program 4010 searches for an unused volume within the site indicated by (f), which satisfies the capacity in (b) and the performance in (c), by referring to the logical volume information 4014 and the physical volume information 4015 (step 9020).

If a corresponding logical volume has been found at step 9020, the configuration construction program 4010 advances to step 9100. In the following description, the logical volume thus found is called the "first logical volume". In step 9100, the configuration construction program 4010 searches in a site (subsidiary site) which is different to the site indicated by (f) (main site) and which contains the host computer indicated by (h), to find a volume that satisfies the capacity in (b) and the performance in (d), by referring to the logical volume information 4014 and the physical volume information (step 9100).

If a corresponding logical volume has been found at step 9100, then the configuration construction program 4010 advances to step 9110. In the following description, the logical volume thus found is called the "second logical volume".

In step 9110, the configuration construction program 4010 sends the control program 2032 an instruction to construct a remote copying configuration using the first logical volume as a main logical volume and the second logical volume as a subsidiary logical volume. Furthermore, the configuration construction program 4010 allocates the first logical volume to the host computer indicated by (g). Moreover, the configuration construction program 4010 allocates the second logical volume to the host computer indicated by (h) (step 9110).

Next, the configuration construction program 4010 sets (a) as the application ID 5001, (c) as the normal required performance 5002, (d) as the required performance for disaster 5003, (e) as the tolerable performance deterioration time 5004, (f) as the site ID 5005, (g) as the normal host ID 5006 and (h) as the disaster host ID 5007. Furthermore, the configuration construction program 4010 updates the use status 6005 and the physical VOL ID 6003 in accordance with the contents of the established remote copying configuration (step 9120). The configuration construction program 4010 then terminates processing.

If a corresponding logical volume could not be found in step 9020, then the program searches the site indicated by (f) to find an unused logical volume which satisfies the capacity in (b), by referring to the logical volume information 4014 (step 9030).

If a corresponding volume could not be found at step 9030, then the configuration construction program 4010 notifies the user that it has not been possible to construct a configuration, via an output device (step 9130), and then terminates processing.

If a corresponding logical volume has been found at step 9030, the configuration construction program 4010 advances to step 9040. In the following description, the logical volume that has been found is called the first alternative volume and the physical volume corresponding to the first alternative volume at this time is called the first physical volume. The configuration construction program 4010 searches for a logical volume which satisfies the conditions of: being a subsidiary logical volume in the storage system to which the first alternative volume belongs, satisfying the capacity in (b), and exceeding the performance requirement in (c) (step 9040). Furthermore, the configuration construction program 4010 may also search for a logical volume which satisfies the conditions of: being a subsidiary logical volume in the storage system to which the first alternative volume belongs, satisfying the capacity in (b), having better performance than the first alternative volume, and having the performance nearest to the performance requirement in (c).

If a corresponding logical volume could not be found at step 9040, then the configuration construction program 4010 advances to step 9050. In the following description, the logical volume that has been found is called the second alternative volume and the physical volume corresponding to the second alternative volume at this time is called the second physical volume.

At step 9050, the configuration construction program 4010 simulates processing which occurs in the event of a disaster, by supposing that the data stored in the second physical volume which corresponds to the second alternative volume is migrated to the first physical volume which corresponds to the first alternative volume, that the first physical volume is allocated to the second alternative volume, and that the second physical volume is allocated to the first alternative volume which is used as a main logical volume of the application in (a) (step 9050).

In this simulation, it is calculated whether or not restoration of performance in the event of a disaster is possible, and the performance deterioration time in the event of disaster, for each application. In the present embodiment, in the event of a disaster, the volumes are rearranged by the method indicated in the description shown in FIG. 12, and therefore the simulation follows this same method.

Figure 12:
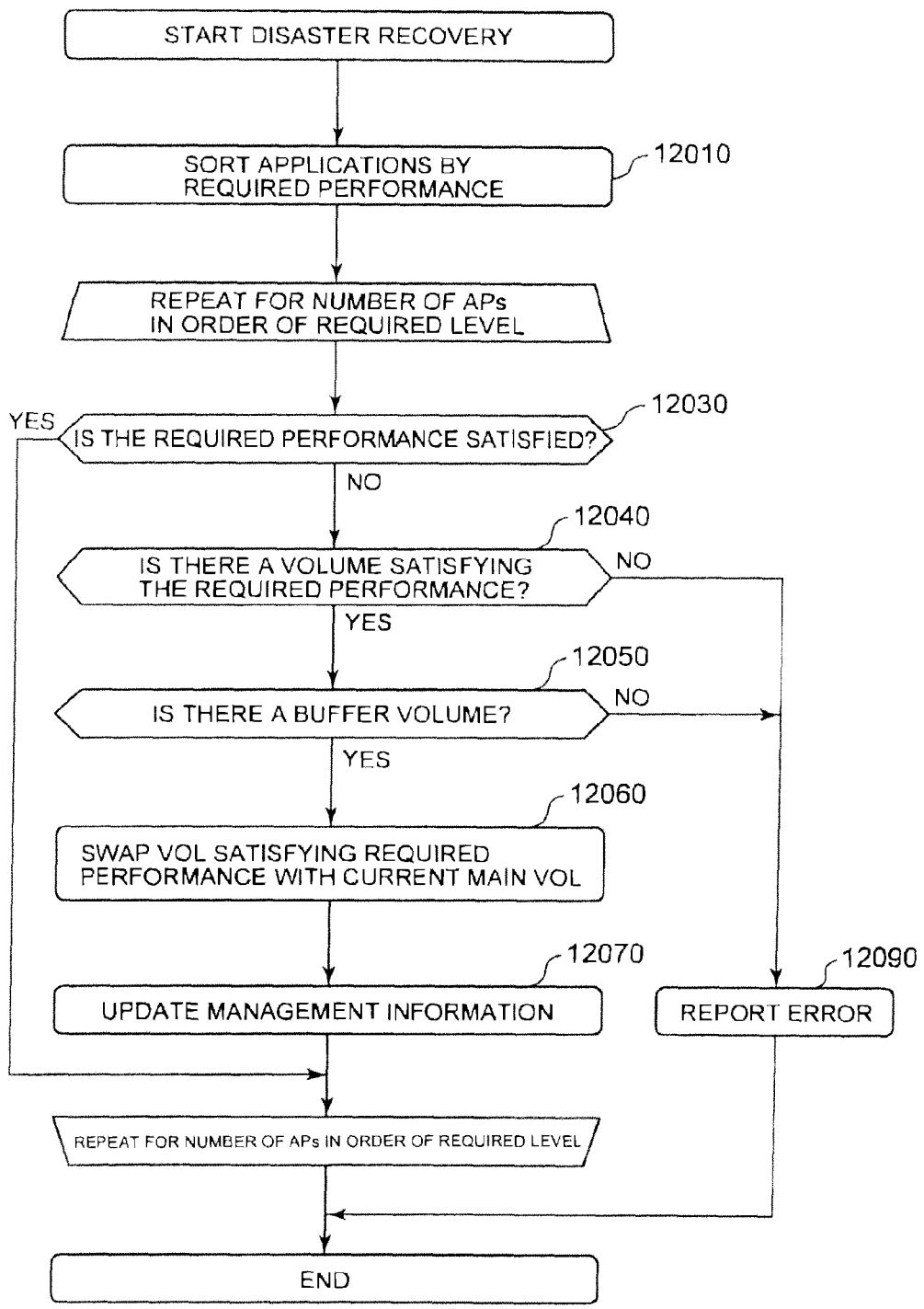
FIG. 12 is a flowchart showing the operation of the disaster recovery program in the first embodiment.

In the simulation shown in FIG. 12, it is judged whether or not there is a case where an error notification 12090 becomes necessary in respect of the second alternative volume to which the first physical volume is allocated. If the error notification 12090 is necessary, then it is judged that restoration of performance in the event of disaster is impossible. Furthermore, if an error notification 12090 is not necessary and it is judged that restoration of performance in the event of disaster is possible, then the time period required to migrate the data of the second alternative volume in order to satisfy the disaster performance requirement is calculated. The calculated time period is taken as the performance deterioration time in the event of disaster. The performance deterioration time in the event of disaster can be calculated on the basis of the volume of data stored in the first physical volume which corresponds to the second alternative volume, and the data migration speed in the data migration performance information 4016. More specifically, if 100 Gb of data in the physical volume allocated to the logical volume "LU02" of the storage system "STG2" is migrated to another physical volume at a data speed of 400 MB/s, then a time of 250 seconds is required.

Furthermore, if a swap process is carried out by using the second alternative volume and another volume as buffer volumes, in order to restore performance in the event of a disaster, then the performance deterioration time in the event of disaster is calculating by also using the volume of data stored in the other volume, in addition to the volume of data stored in the second alternative volume and the data migration speed in the data migration performance information 4016. More specifically, the performance deterioration time in the event of disaster is the sum of the time taken for the data stored in the physical volume associated with the other volume to be migrated to the physical volume associated with the buffer volume, and the time taken for the data stored in the physical volume associated with the second alternative volume to be migrated to the physical volume associated with the other volume.

In the present embodiment, the method shown in FIG. 12 is used as an algorithm for rearranging volumes, but if volumes are rearranged using another algorithm, then the performance deterioration time must be calculated using a corresponding method.

A volume which is judged capable of restoring performance in the event of a disaster and which has a tolerable performance deterioration time exceeding the performance deterioration time is selected, from the second alternative volumes. The selected volume is set as a new second alternative volume.

If a corresponding logical volume could not be found at step 9040, then the configuration construction program 4010 skips step 9050.

Next, the configuration construction program 4010 presents, to the user via the output screen, the alternative configuration using the first alternative volume and second alternative volume so as to satisfy the normal performance requirement (step 9060). There are two types of the alternative configuration shown here.

The alternative configuration type 1 is a configuration which uses the first alternative volume as a main logical volume. The alternative configuration type 2 is a configuration which associates the second physical volume which is associated with the second alternative volume in normal operation, with the first alternative volume and uses same as a main logical volume. Essentially, if there is a disaster in a site which includes a main logical volume forming a pair with the second alternative volume as a subsidiary logical volume, then the physical volume of the first alternative volume is used as the main logical volume. The user is able to choose a processing flow from one of three options, alternative configuration type 1, alternative configuration type 2 and interrupt construction, from the screen presented in this step. An example of the composition of this screen is described here with reference to FIG. 10.

The configuration construction program 4010 accepts an input from a user via an input device, on the basis of the screen presented on the output device at step 9060 (step 9070). Below, the processing from step 9070 onwards is described separately in respect of the options: "interrupt processing", "alternative configuration type 2" and "alternative configuration type 1".

If the input at step 9070 is a value indicating interruption of construction, then a notification that the construction has been interrupted is shown to the user (step 9130) and processing is terminated.

If the input at step 9070 is a value indicating the alternative configuration type 2, then the configuration construction program 4010 swaps the first alternative volume and the second alternative volume (step 9090). More specifically, the configuration construction program 4010 instructs the control program 1032 to migrate the data stored in the second physical volume which is associated with the second alternative volume, to the first physical volume which is associated with the first alternative volume. The control program migrates the data stored in the second physical volume which is associated with the second alternative volume, to the first physical volume which is associated with the first alternative volume.

The control program 1032 also carries out a process for changing the associations of the logical volumes and physical volumes. More specifically, the control program 1023 cancels the association (allocation) of the second physical volume to the second alternative volume. The control program 1023 associates the first physical volume which was associated with the first alternative volume, with the second alternative volume. Moreover, the control program 1023 associates the first physical volume which was associated with the first alternative volume, with the second alternative volume. The foregoing is a swapping process.

If the input at step 9070 is a value indicating the alternative configuration type 1, then the configuration construction program 4010 skips step 9090.

Next, the configuration construction program 4010 advances to step 9100. This step is as described previously.

Thereupon, the configuration construction program 4010 advances to step 9110. Below, the differences with respect to the step 9110 described above are indicated. The volume set as the main logical volume of the remote copy is taken as the first alternative volume. If the alternative configuration type 2 is selected at step 9070, then the second physical volume which was associated with the second alternative volume before the swap in step 9090 is associated with the first alternative volume. Furthermore, the configuration construction program 4010 allocates the first alternative volume to the host computer indicated by (g). Furthermore, the configuration construction program 4010 allocates the second logical volume to the host computer indicated by (h).

Thereupon, the configuration construction program 4010 advances to step 9120. This step is virtually the same as that described above, and therefore only the differences are explained here. The performance of the physical volume that was associated with the first alternative volume at the time of step 9030 is set as the normal required performance 5002. The configuration construction program 4010 then terminates processing. The foregoing was the flow of processing by the configuration construction program 1251.

FIG. 10 is a diagram showing an example of the composition of an alternative configuration proposal screen which is displayed at step 9060 in FIG. 9, in the present embodiment.

In this embodiment, three options are presented to the user. By selecting one of the option 10010, the option 10020 and the option 10030, and then pressing the button 7040, the user is able to input to the configuration construction program 4020 whether or not an alternative configuration is acceptable, and if acceptable, the general type of configuration accepted.

The option 10010 is an option which permits the alternative configuration type 1. The performance in the alternative configuration type 1 with respect to the normal required performance is displayed below the option. The performance during normal operation is shown to be lower than the required performance.

The option 10020 is an option which permits the alternative configuration type 2. The performance in the alternative configuration type 2 with respect to the normal required performance is displayed below the option. This shows that, during normal operation, it is possible to offer a performance which exceeds or is close to the required performance, in the main logical volume, but if there is a disaster in the other site, then the performance is lower than the required performance. This option is only activated when all of the following conditions are satisfied: that a corresponding subsidiary logical volume has been found at step 9040; that the performance deterioration time in the event of disaster calculated at step 9050 is less than the tolerable performance deterioration time in the event of disaster for each application; and that it is judged at step 9050 that restoration of performance is possible in the event of disaster.

The option 10030 is an option which indicates that the alternative configuration cannot be accepted and that the construction of a configuration is to be interrupted.

The foregoing was an example of the composition of a screen which is displayed to the user at step 9060 in FIG. 9. In the present embodiment, in controlling the activity and inactivity of the option 10020, it is judged whether the performance deterioration time in the event of disaster calculated at step 9050 is less than the tolerable performance deterioration time in the event of disaster of each application, but as a further example, it is also possible to display the performance deterioration time in the event of disaster of each application, as calculated at step 9050, below the option 10020, and to judge whether this value is tolerable, on this screen. In this case, it is possible to omit the input of (e) in step 9010 and the management of the performance deterioration time 5004. This configuration is effective in a case where there is a small number of users who manage the applications in the computer system and the tolerable performance deterioration time is shared by the users.

FIG. 11 is a diagram showing one example of a flowchart of the actions of an operation monitoring program in the present embodiment. More specifically, FIG. 11 is a diagram showing the flow of processing whereby the operational status monitoring program 4011 monitors the state of access to the main logical volume in the disaster recovery environment during operation, and if the performance of the main logical volume is insufficient, migrates the physical volume associated with the main logical volume to another physical volume, in accordance with an instruction from a user.

The operational status monitoring program 4011 is started up and continues running in the computer system as a daemon process. Firstly, the operational status monitoring program 4011 waits for a prescribed time period (step 11010). This prescribed time may be specified by the user or may be encoded in the program.

After the prescribed time period has elapsed, the operational status monitoring program 4011 searches for main logical volumes in the computer system. The processing in step 11030 to step 11130 is repeated in respect of each of the main logical volumes thus searched. In the following description, the main logical volume which is the object of processing is called the object main logical volume and the physical volume corresponding to the object main logical volume is called the first physical volume.

Firstly, the operational status monitoring program 4011 acquires the access volume per unit time to the object main logical volume (step 11030).

Next, the operational status monitoring program 4011 judges whether or not the access volume per unit time exceeds the performance of the object main logical volume or has a possibility of exceeding same (step 11040). In the judgment process in this step, it is possible to judge that there is a possibility of exceeding the performance of the object main logical volume if the access volume per unit time acquired at step 11030 has exceeded a uniform threshold value, and it is also possible to keep a history of values acquired at step 11030 and to judge whether there is a possibility of exceeding the performance of the object main logical volume by means of trend analysis.

If, as a result of the judgment in step 11040, it is judged that there is no possibility of exceeding the performance of the object main logical volume, then the operational status monitoring program 4011 transfers to step 11020, and transfers to processing in respect of the next main logical volume.

If, as a result of the judgment in step 11040, it is judged that there is a possibility of exceeding this performance, then the operational status monitoring program 4011 judges whether or not there is a buffer volume (step 11050). In this step, using the logical volume information 4014, the operational status monitoring program 4011 judges whether or not there exists, in the storage system to which the object main logical volume belongs, a logical volume which is designated as a buffer volume and which has the same capacity as the object main logical volume or a capacity exceeding the capacity of the object main logical volume.

If, as a result of the judgment in step 11050, there is no corresponding logical volume, then the operational status monitoring program 4011 sends a warning to the user indicating that there is a risk that the access volume will exceed the performance of the object main logical volume (step 11130), whereupon the program transfers to step 11020 and carries out processing in respect of the next main logical volume.

If a corresponding logical volume is found as a result of the judgment in step 11050, then the operational status monitoring program 4011 advances to step 11060. In step 11060, the operational status monitoring program 4011 searches in the storage system to which the object main logical volume belongs to find a subsidiary logical volume having better performance than the object main logical volume, on the basis of the logical volume information 4014 (step 11060). In the present embodiment, a logical volume having better performance means a logical volume having a higher IOPS value in the physical volume which forms that logical volume.

If, as a result of step 11060, there is no corresponding subsidiary logical volume, then the operational status monitoring program 4011 sends a warning to the user indicating that there is a risk that the access volume will exceed the performance of the object main logical volume (step 11130), whereupon the program transfers to step 11020, thereby transferring to processing of the next main logical volume.

If, as a result of step 11060, the operational status monitoring program 4011 has found a corresponding subsidiary logical volume, then the program advances to step 11070. In the following description, the subsidiary logical volume that has been found is called the alternative volume and the physical volume corresponding to the alternative volume at this time is called the second physical volume. At step 11070, the operational status monitoring program 4011 carries out a simulation of processing in the event of a disaster, thereby calculating whether or not restoration of performance in the event of a disaster is possible and calculating the performance deterioration time (step 11070). The method of calculating the performance recovery time and the performance deterioration time is as stated in step 9050.

As a result of the simulation in step 11070, it is judged whether or not restoration of performance in the event of a disaster is possible (step 11075). It is also judged whether or not the performance deterioration time in the event of disaster exceeds the tolerable performance deterioration time of the application which uses the alternative volume. If the recovery of performance in the event of disaster is not possible, or if the performance deterioration time exceeds the tolerable performance deterioration time of the application which uses the alternative volume as a subsidiary logical volume, then a warning is reported to the user (step 11130), whereupon the procedure transfers to step 11020 and switches to processing in respect of the next main logical volume.

Thereupon, the operating status monitoring program 4011 presents an alternative configuration to the user (step 11080). Here, only one type of alternative configuration is displayed. This is a configuration in which the alternative volume and the object main logical volume are swapped. The user can choose one of two processing options: either to select this configuration or to continue with the current configuration. The composition of this screen is the same as that in FIG. 10, apart from the fact that the options are changed to the two options stated above, and therefore this screen in not shown in the drawings.

A user input is received via the screen displayed in step 11080 (step 11090).

If the user input received at step 11090 indicates that the current configuration is to be continued, then a warning is sent to the user indicating that there is a risk that the access volume will exceed the performance of the object main logical volume (step 11130), whereupon the program transfers to step 11020 and switches to processing in respect of the next main logical volume.

If the user input received at step 11090 means that the alternative configuration is accepted, then the operating status monitoring program 4011 swaps the object main logical volume and the alternative volume (step 11100). More specifically, the control program 2032 is instructed to migrate the data stored in the second physical volume which corresponds to the alternative volume, to the physical volume which corresponds to the buffer volume. Upon receiving this instruction, the control program 2032 is instructed to migrate the data stored in the second physical volume which corresponds to the alternative volume, to the physical volume which corresponds to the buffer volume. Thereupon, the control program 2032 is instructed to migrate the data stored in the first physical volume which is associated with the object main logical volume, to the second physical volume which corresponds to the alternative volume. Upon receiving this instruction, the control program 2032 migrates the data stored in the first physical volume which is associated with the object main logical volume, to the second physical volume which corresponds to the alternative volume.

As stated previously, this migration of the data is performed by the control program 2032 carrying processing for changing the associations of the logical volumes and physical volumes. More specifically, firstly, the control program 2032 associates the physical volume that was associated with the buffer volume, with the alternative volume. Next, the control program 2032 associates the second physical volume that was associated with the first alternative volume, with the object main logical volume.

Finally, the operational status monitoring program 4011 updates the use status 6005, the attribute 6006 and the physical VOL ID 6003 in accordance with the settings made (step 11110). The configuration construction program 4011 then returns to step 11020 and continues processing in respect of the next main logical volume.

When the processing from step 11030 to step 11130 has been completed in respect of all of the main logical volumes, the operational status monitoring program 4011 returns to step 11010.

The foregoing was the flow of processing by the operational status monitoring program 4011.

FIG. 12 is a diagram showing the flow of processing carried out by the disaster recovery program 4012 to re-allocate volumes having the performance required by the respective applications in the event of a disaster. FIG. 12 shows processing in the event of a site actually suffering a real disaster. The simulations in 9050 in FIGS. 9 and 11070 in FIG. 11 determined the logical volume from which data is to be migrated and the data migration destination, following the flow of processing in FIG. 12.

The disaster recovery program 4012 is started up in the event of a disaster in one site, taking as a parameter the site ID of the site which has not suffered a disaster. When started up, the disaster recovery program 4012 sorts the applications to be executed by the host computer of the site which has not suffered a disaster after the one site has suffered a disaster, in order from the application having the highest required performance (step 12010). In this sorting process, the site ID input as a parameter and the site ID 5005 are compared, and in the case of applications for which these IDs are matching, the normal required performance 5002 is set as the required performance, while in the case of applications for which the IDs are not matching, the required performance for disaster 5003 is set as the required performance. An application in which the site ID input as a parameter and the site ID 5005 are matching is an application which was using the site not suffering a disaster as a main site, before the occurrence of a disaster in the one site. An application in which the site ID input as a parameter and the site ID 5005 are not matching is an application which was using the site not suffering a disaster as a subsidiary site, before the occurrence of a disaster in the one site.

Thereupon, the disaster recovery program 4012 repeats the processing from step 12030 to step 12070 in respect of the each of the applications, one by one, following their order after sorting. In the following description, an application which is the object of processing is called an object application.

Firstly, the disaster recovery program 4012 compares the required performance which was used in step 12010 with the performance of the logical volume used by the object application (step 12030).

If the required performed is satisfied, then the disaster recovery program 4012 returns to step 12020 and continues processing in respect of the next application.

If the required performance is not satisfied, then the program searches for a logical volume based on the conditions that the logical volume belongs to the same storage system as the logical volume used by the object application and satisfies the required performance (step 12040). Furthermore, it is also possible to search for a logical volume based on the conditions that the volume has not been designated as a buffer volume, and is not being used by an application having a higher required performance than the object application (step 12040).

If, as a result of step 12040, it has not been possible to find a corresponding volume, then an error is reported to the user (step 12090), followed by abnormal termination.

If, as a result of step 12040, it has been possible to find a corresponding volume, then the disaster recovery program 4012 advances to step 12050. The volume thus found is called the first alternative volume. At step 12050, the disaster recovery program 4012 searches for a buffer volume having a capacity equal to or greater than the logical volume used by the object application (step 12050). If, as a result of this search, it has not been possible to find a corresponding volume, then an error is reported to the user (step 12090), followed by abnormal termination.

If, as a result of step 12050, it has been possible to find a corresponding volume, then the disaster recovery program 4012 issues an instruction to the storage system to swap the logical volume used by the object application with the first alternative volume (step 12060). The control program of the storage system which has received this swap instruction migrates the data stored in the physical volume corresponding to the first alternative volume, to the physical volume corresponding to the buffer volume. Next, the control program migrates the data of the physical volume corresponding to the logical volume used by the object application to the physical volume that was associated with the first alternative volume. The control program then migrates the data that has been migrated to the physical volume corresponding to the buffer volume from the physical volume corresponding to the first alternative volume, to the physical volume that was associated with the logical volume used by the application. The control program allocates the physical volume that was associated with the first alternative volume, to the logical volume used by the application. Furthermore, the control program allocates the physical volume which corresponded to the logical volume used by the application, to the first alternative volume.

If data is not stored in the first alternative volume, then it is possible to migrate the data stored in the physical volume corresponding to the logical volume used by the object application, to the physical volume corresponding to the first alternative volume, without using a buffer volume.

Finally, the disaster recovery program 4012 updates the use status 6005, the attribute 6006 and the physical VOL ID 6003 in accordance with the settings made at step 12060 (step 12070).

The foregoing was the flow of processing performed by the disaster recovery program 4012.

In the present embodiment, the data migration method is described in volume units, but it may also be carried out in page units. Furthermore, it is also possible to adopt a method which uses data migration in page units to allocate a page from a physical volume which satisfies the required performance, only in the event of a write operation, if the tolerable performance deterioration time is equal to or greater than a set time.

The foregoing was a description of a first embodiment of the present invention.

According to the present embodiment, in an active-active disaster recovery configuration, when returning to an original state within the tolerable performance deterioration time in the event of a disaster, a physical volume of high performance allocated as a subsidiary logical volume can be used as a main logical volume of an application running on the site where this subsidiary logical volume is present. By this means, since the high-performance volume is allocated as a subsidiary logical volume, then it becomes possible to make use of performance which has not been utilized completely, and hence the usage rate of the whole storage system can be improved.

(Second Embodiment)

Next, a second embodiment will be described.

In the present embodiment, the host computer included in the computer system is a host computer which runs a plurality of virtual host computers. A virtual host computer is called a virtual server or a virtual machine (VM). Furthermore, in order to clarify the description, a host computer which runs a virtual server is called a physical server.

By constructing virtual servers in a host computer contained in the computer system which employs the present invention, it is possible to improve the usage rate of the storage system. In the first embodiment, it was also possible to obtain similar beneficial effects. However, the usage rate of the storage system depends on the performance of the data interface of the host computer, and there may be cases where it is not possible to make sufficient use of the performance of the high-performance physical volume. On the other hand, it is possible to allocate a virtual data interface to a virtual server. In the present embodiment, the problem described above is countered by re-allocating virtual data interfaces in accordance with the performance of the re-allocated physical volumes. Below, this virtual data interface is known as a "virtual data interface".

Furthermore, if a plurality of virtual servers are running on a single physical server, then in order to guarantee the performance of the virtual data interfaces, the performance of the virtual data interfaces of the respective virtual servers must be equal to or lower than the performance of the data interface of the physical server. Consequently, there is a possibility that it may not be possible to re-allocate a virtual data interface which is suited to the performance of a physical volume which has been re-allocated in accordance with the present invention, depending on the performance of the data interface of the physical server and the performance of the virtual data interfaces of the other virtual servers running on the physical server. In a virtual server environment, it is possible to migrate virtual servers between physical servers, and therefore, in the present embodiment, the aforementioned problem can be countered by searching for a physical server having a suitable data interface and migrating the virtual server to that physical server. Below, the method of implementation will be described.

(2-1) System Configuration According to Second Embodiment

The configuration of the computer system in the present embodiment is almost the same as the first embodiment, and therefore the following description relates principally to the differences.

In the present embodiment, an overview of the configuration of the computer system is similar to FIG. 1, and therefore is not depicted in the drawings.

The host computer A1101, host computer B1202, host computer C1201 and host computer D1102 are physical servers and a plurality of virtual servers are operated inside these host computers.

The differences with respect to the computer system in FIG. 1 are as indicated below. In the present embodiment, the host computer D1102 is connected to a data network. The host computer D1102 accesses the logical volume A1111 via the data network A1104. Furthermore, the host computer C1201 is connected to the data network B1204. The host computer C1201 accesses the logical volume B1212 via the data network B1204.

The point of difference is that the virtual servers are migrated between the host computer A1101 and the host computer D1102, or between the host computer B1202 and the host computer C1201, and access to the storage system is still possible after this migration of the virtual servers. Migrating a virtual server in a virtual server environment means migrating the configuration information and information relating to the operational status of the virtual server which includes the logical volume used, from a first physical server to a second physical server, and reconstructing the related configuration information and operational status information in the second physical server. Therefore, a logical volume accessed from a virtual server must be accessible from both the first physical server and the second physical server.

Figure 13:
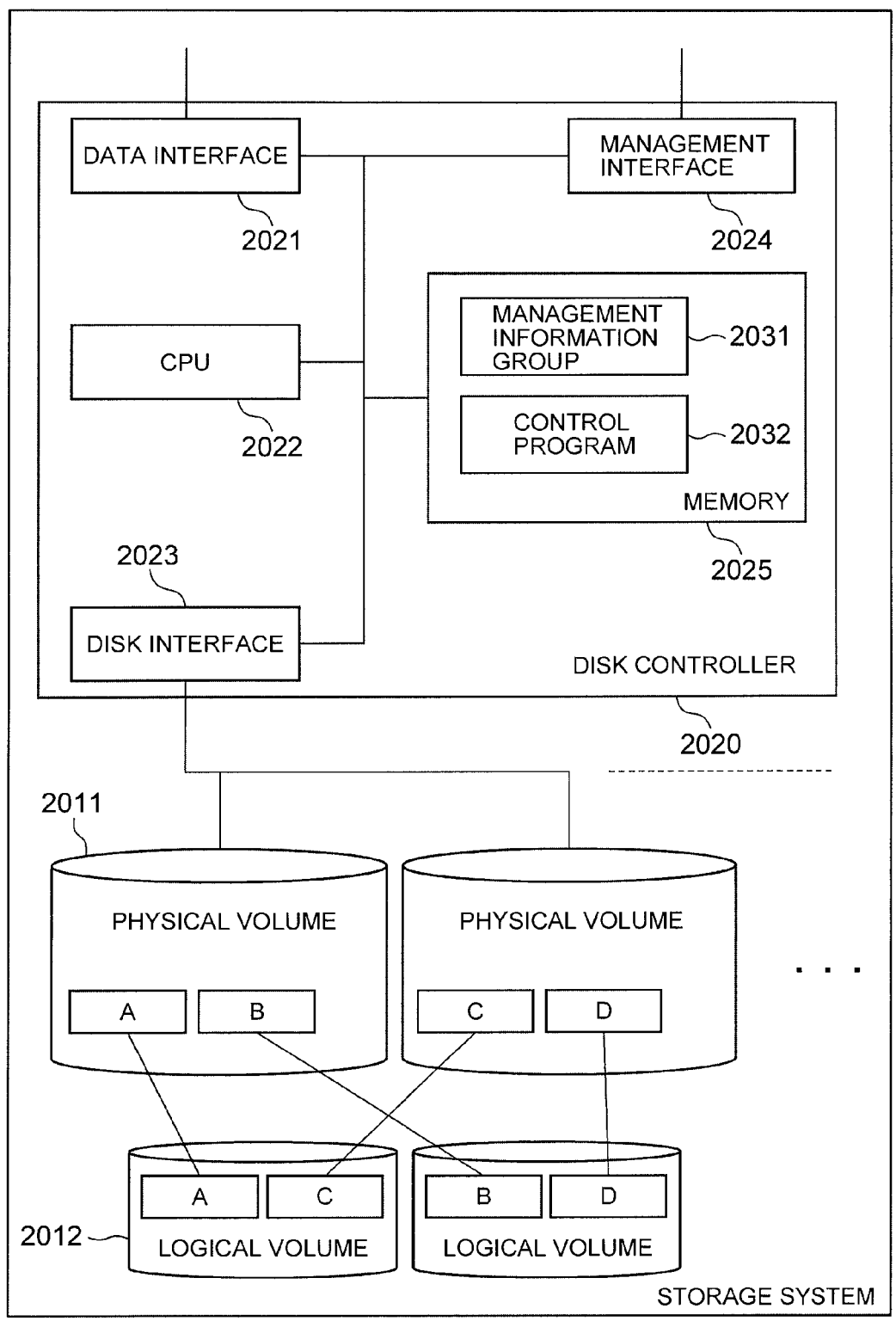
FIG. 13 is a block diagram showing an example of the configuration of a storage system in a second embodiment of the present invention.

FIG. 13 is a diagram showing an example of the configuration of the storage system 1103 and the storage system 1203 according to the present embodiment. In the present embodiment, a logical volume 2012 is managed by the control program 2032 by dividing the logical volume into one or more areas. These areas are called logical pages. Furthermore, a physical volume 2011 is also managed by the control program 2032 by dividing into one or more areas. These areas are called physical pages. The control program 2032 manages the associations between logical pages and physical pages. These associations are called a logical-physical page map. The control program 2032 carries out access processing by converting access to a logical volume 2012 into access to a physical volume 2011, on the basis of the associations in the logical-physical page map. When a write operation has arisen in a logical page for which an association has not been made, the control program 2032 associates an unused physical page with this logical page.

Moreover, the control program 2032 is able to change the contents of the logical-physical page mapping upon an instruction from a user or a program which is external to the management computer. For example, the control program 2032 accepts an instruction from the user (or management computer) in such a manner that a logical page having address 0x00ff to 0x0fff of a particular logical volume is migrated to a physical page of a high-performance physical volume from a physical page of a low-performance physical volume. In so doing, the control program 2032 identifies the page of the physical volume associated with the designated logical page. The control program 2032 locates an unused physical page of the same capacity in the high-performance physical volume and copies the data of the physical page of the low-performance physical volume to this physical page. The designated physical page is re-associated with the physical page of the copy destination.

In input/output operations of the host computers and input/output operations of the remote copy function of the storage system, data is accessed by using a logical volume address and therefore such operations are not affected by changes to the contents of the logical-physical page map. Furthermore, in the management program in the management computer, in order to simplify management, a plurality of physical volumes having equivalent attributes are managed as a pool. This also applies in the present embodiment, but it is also possible to adopt other management modes, such as managing each physical volume individually, or the like. In the description given below, changing the contents of the logical-physical page mapping in association with data migration between pages is called a page-to-page data migration.

Figure 14:
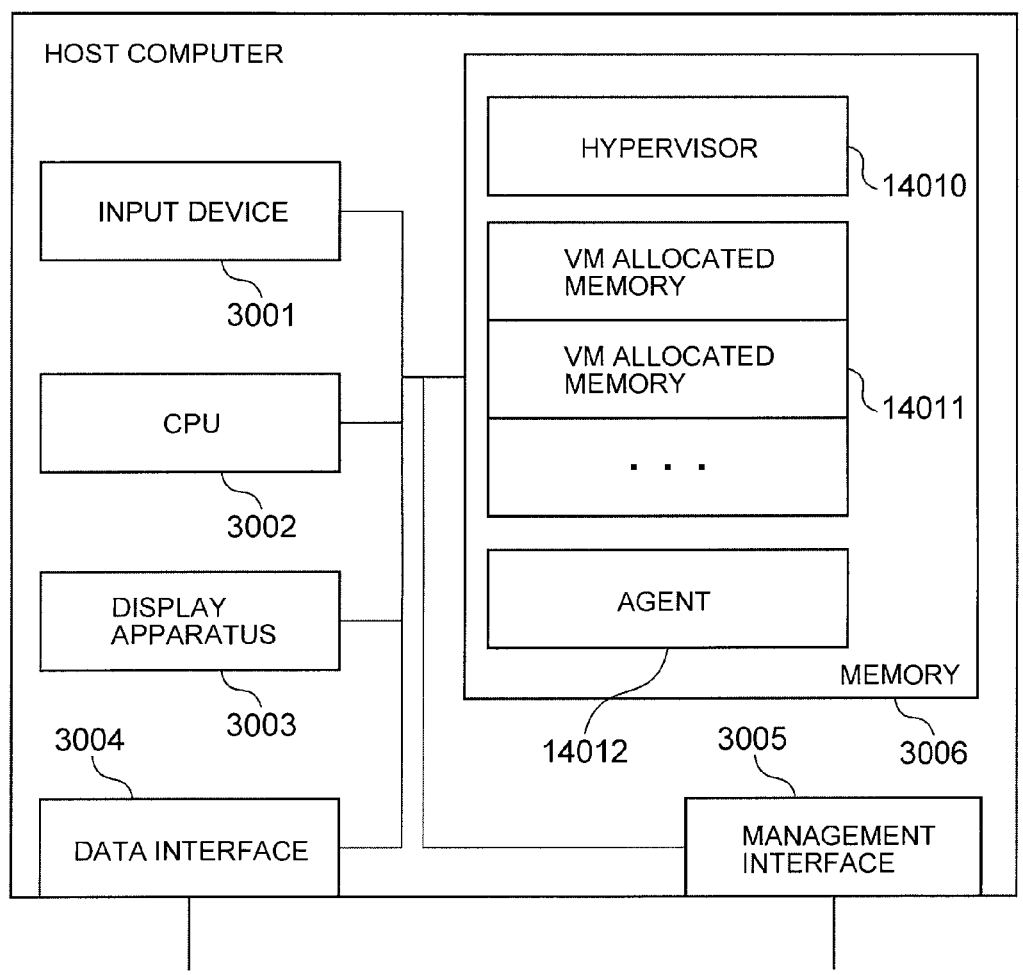
FIG. 14 is a block diagram showing an example of the configuration of a host computer in the second embodiment.

FIG. 14 is a block diagram showing an example of the composition of the host computer A1101, the host computer B1202, the host computer C1201 and the host computer D1102 in the present embodiment. In the present embodiment, a hypervisor 14010, VM allocation memories 14011 and an agent 14012 are stored in the memory 3006.

The hypervisor 14010 is a program for running virtual servers. The hypervisor 14010 manages virtual servers operating on the physical server where the hypervisor is running. More specifically, the hypervisor 14010 allocates a virtual volume to a virtual server. A virtual server is able to perform data writing and reading by using this virtual volume. Below, this virtual volume is known as a "virtual volume". This virtual volume is stored as a file in a logical volume 2011 used by a physical server. Below, this file is called a "virtual volume file".

Furthermore, the hypervisor 14010 is able to allocate a virtual memory to a virtual server. The virtual server is able to run an application on this virtual memory. Below, this virtual memory is called a "virtual memory".

Moreover, the hypervisor 14010 is able to allocate a virtual data interface having access performance as an attribute, to a virtual server. By means of this virtual data interface, it is possible to guarantee the access performance of a plurality of virtual servers within the range of the access performance of the data interface of the physical server. Below, this virtual data interface is called "virtual data interface".

Furthermore, the hypervisor 14010 is able to migrate a virtual server from one physical server to another physical server in accordance with an instruction from a user or an external program. For instance, the hypervisor 14010 running on the host computer A1101 can receive an instruction for migrating a virtual server running on the host computer A1101 to the host computer D1102. Upon receiving this instruction, the hypervisor 14010 on the host computer A1101 causes the hypervisor 14010 on the host computer D1102 to reserve memory of the same capacity as the virtual memory allocated to the virtual server. Thereupon, the hypervisor 14010 on the host computer A1101 transfers the information in the memory allocated to the virtual server, and the configuration information of the virtual server, such as the virtual data interface, virtual volume and the like, to the hypervisor 14010 running on the host computer D1102. Upon receiving this information, the hypervisor 14010 on the host computer D1102 stores the received information, in the reserved area of the memory of the host computer D1102. The hypervisor 14010 on the host computer D1102 starts up the virtual server on the basis of the received configuration information.

The VM allocation memories 14011 are virtual memories which are allocated to a virtual server as described above.

The agent 14012 is a program for acquiring configuration information about virtual servers, from the hypervisor 14010. Upon an instruction from the VM configuration information gathering program 15001 running on the management computer 1500 described below, the agent 14012 acquires information from the hypervisor 14010 and presents this information to the VM configuration information gathering program 15001.

Figure 15:
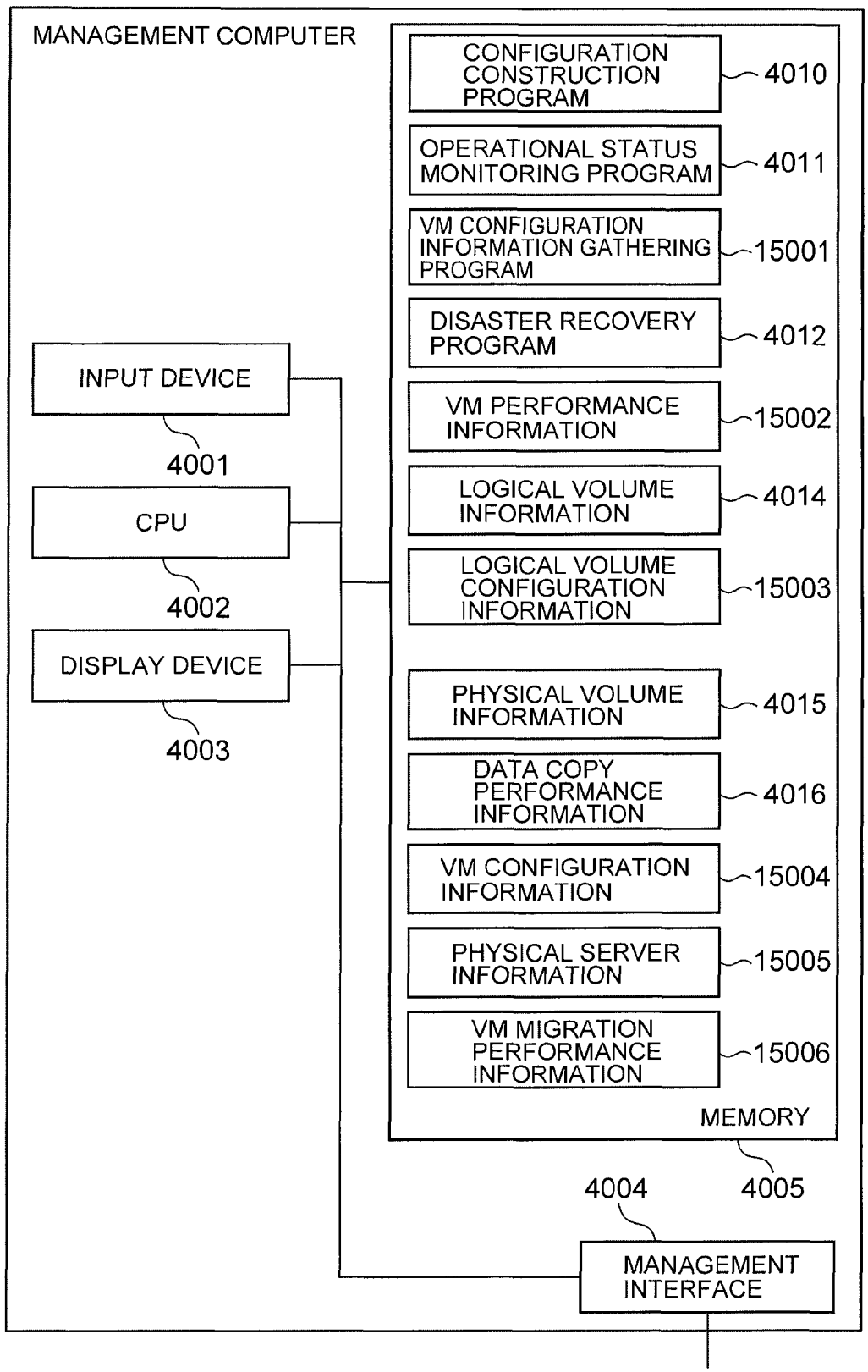
FIG. 15 is a block diagram showing an example of the configuration of a management computer in the second embodiment.

FIG. 15 is a block diagram showing one example of the configuration of the management computer 1500 according to the present embodiment.

In the present embodiment, a VM configuration information gathering program 15001, VM performance information 15002, logical volume configuration information 15003, VM configuration information 15004, physical server information 15005 and VM migration performance information 15006 are newly stored in the memory 4005.

The VM configuration information gathering program 15001 gathers the configuration information for the virtual servers from the agent 14012 described above. The user starts up this program by specifying the ID of a physical server as a parameter. The VM configuration information gathering program 15001 which has been started up instructs the agent 14012 on the designated physical server to gather configuration information. Upon receiving this instruction, the agent 14012 acquires the information about the virtual servers operating on the physical server where the agent is running, from the hypervisor 14010. The information thus acquired is the capacity of the virtual memory allocated to each virtual server, the performance of the virtual data interface, the address of the logical volume where the virtual volume file is stored, and the like. Furthermore, the agent 14012 also acquires information about the hypervisor 14010. The information thus acquired is the I/O performance and amount of memory which the hypervisor 14010 can allocate to the virtual servers, and the like. Moreover, the agent 14012 also acquires the speed of data transfer which occurs when the VM are migrated between physical servers. The agent 14012 presents this information to the VM configuration information gathering program 15001. Upon receiving this information, the VM configuration information gathering program 15001 stores the logical volume 4014, VM configuration information 15004, physical server information 15005, and VM migration performance information 15006, which are described below.

The VM performance information 15002, the logical volume configuration information 15003, the VM configuration information 15004, the physical server information 15005 and the VM migration performance information 15006 are described with reference to separate drawings.

FIG. 16 is a diagram showing one example of the configuration of the VM performance information 15002 according to the present embodiment.

The VM performance information 15002 is obtained by changing the application information 4013 to match the virtual server.

The application ID 5001 is changed to a VM ID 16001 which uniquely identifies the virtual server in the present computer system.

Furthermore, the normal host ID 5006 is changed to a normal physical server ID 16002 which uniquely indicates the physical server on which the virtual server is run normally.

Moreover, the disaster host ID 5007 is changed to a disaster physical server ID 16003 which uniquely indicates the physical server on which the virtual server is run in the event of a disaster.

FIG. 17 is a diagram showing one example of the configuration of logical volumes 4014 according to the present embodiment.

In this diagram, a portion of FIG. 6 is modified. As stated previously, in the present embodiment, logical volumes are associated with physical volumes in page units, by means of a logical-physical page map. The management method relating to this is described in a separate diagram and therefore the physical VOL ID 6003 is removed.

Furthermore, a used volume 17001 which indicates the used volume of the logical volume is added. A virtual volume is stored as a file in a logical volume. The size of the virtual volume which can be allocated to a virtual server depends on the free capacity of the logical volume. Therefore, in the present embodiment, the used volume of the logical volume is managed in this table. As stated previously, this information is gathered by the VM configuration information gathering program 15001 from the agent 14012.

FIG. 18 is a diagram showing one example of the configuration of the logical volume configuration information 15003 according to the present embodiment. This is a table which manages the information of the physical-logical page map described above.

The storage ID 18001 stores an ID for uniquely identifying the storage system in the computer system.

The logic VOL ID 18002 stores an ID for uniquely identifying the logical volume in the storage system indicated by the storage ID 18001.

The start address 18003 indicates the start position of the page (area) in the logical volume indicated by the physical VOL ID 18002.

The end address 18004 indicates the end position of the page (area) in the logical volume indicated by the physical VOL ID 18002.

The pool ID 18005 stores an ID for uniquely identifying, in the computer system, a pool which includes the physical volume corresponding to the page indicated by the storage ID 18001, the logical VOL ID 18002, the start address 18003 and the end address 18004.

These information elements are acquired by the configuration construction program 4010 from the control program 2032, via the management network 1300. This acquisition process is evident to any technician familiar with the field relating to the present invention and therefore description thereof is omitted here.

FIG. 19 is a diagram showing one example of the configuration of the physical volume information 4015 according to the present embodiment. This diagram is obtained by modifying FIG. 7 in order to conform to the present embodiment.

In the present embodiment, a plurality of physical volumes having the same performance are managed as a pool. Therefore, the physical VOL ID 7002 is changed to a Pool ID 19001 which stores an ID for uniquely identifying a pool in the computer system.

Furthermore, the physical volumes in the pool are allocated in page units to logical volumes. The allocatable volume of a physical page having particular characteristics depends on the total capacity and the allocated capacity of the physical pages in the pool having those characteristics. Therefore, the total capacity and allocated capacity (used capacity) are managed in this table. The capacity 19002 which stores the capacity of the whole pool, and the used capacity 19003 which stores the allocated capacity are added as fields to the table.

This information is acquired by the configuration construction program 4010 from the control program 2032, via the management network 1300. This acquisition process is evident to any technician familiar with the field relating to the present invention and therefore description thereof is omitted here.

FIG. 20 is a diagram showing one example of the configuration of the VM configuration information 15004 according to the present embodiment.

The VM ID 20001 stores an ID for uniquely identifying a virtual server in the computer system. The following fields store information relating to the virtual server indicated by this value.

The allocated memory volume 20002 stores a value indicating the capacity of virtual memory which has been allocated.

The allocated data interface performance 20003 stores a value indicating the performance of the allocated virtual data interface.

The storage ID 20004, the logical volume ID 20005 and the logical volume address 20006 store values indicating the area where the virtual volume file of the allocated virtual volume is stored.

The storage ID 20004 stores the ID of the storage system. The logical volume ID 20005 stores the ID of the logical volume. The logical volume address 20006 stores the storage address of the file. If a file is stored over a plurality of areas, the this value is expressed in the form of a sequence of values separated by commas.

As stated previously, this information is gathered by the VM configuration information gathering program 15001 from the agent 14012.

Figure 21:
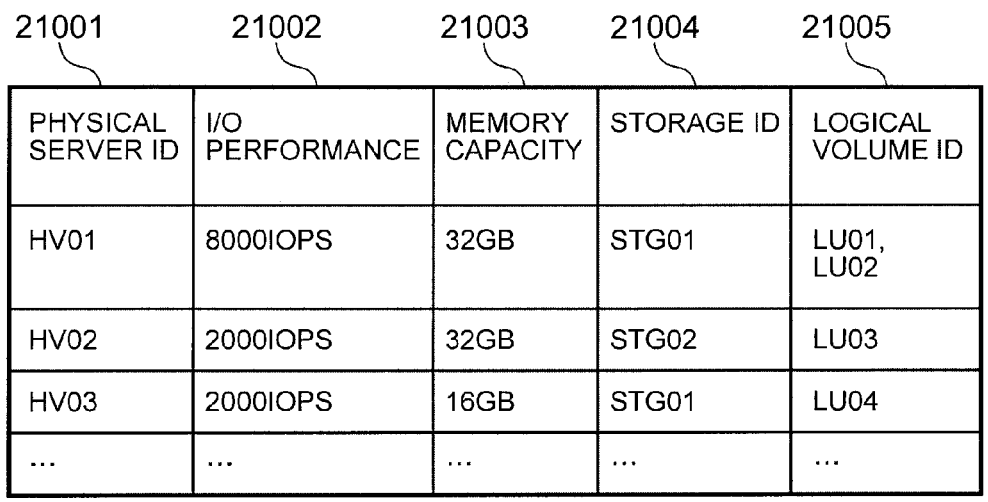
FIG. 21 is a diagram showing an example of the configuration of a table of physical server information in the second embodiment.

FIG. 21 is a diagram showing one example of the configuration of the physical server information 15005 according to the present embodiment.

The physical server ID 21001 stores an ID for uniquely identifying a physical server in the computer system. The following fields store information relating to the physical server indicated by this value.

The I/O performance 21002 stores the sum of the I/O performance which can be processed by the physical data interface that can be allocated to virtual servers by the hypervisor on the physical server.

The memory volume 21003 stores the sum of the memory capacity which can be allocated to virtual servers by the hypervisor on the physical server.

The storage ID 21004 stores the ID of the storage system which stores the virtual volume files of the virtual volumes allocated to the virtual servers by the hypervisor on the physical server.

The logical volume ID 21005 stores the ID of the logical volume which stores the virtual volume files of the virtual volumes allocated to the virtual servers by the hypervisor on the physical server.

As stated previously, this information is gathered by the VM configuration information gathering program 15001 from the agent 14012.

Figure 22:
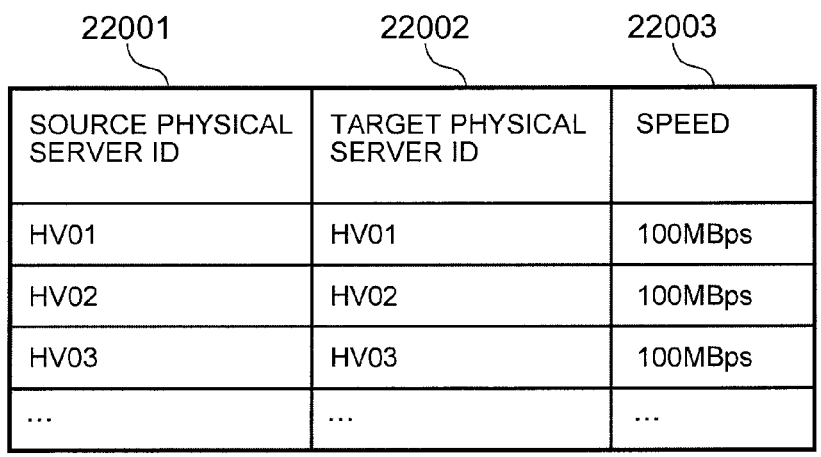
FIG. 22 is a diagram showing an example of the configuration of a table of VM migration performance information in the second embodiment.

FIG. 22 is a diagram showing one example of the configuration of the VM migration performance information 15006 according to the present embodiment.

The source physical server ID 22001 stores an ID for uniquely identifying a physical server in the computer system. The target physical server ID 22002 stores an ID for uniquely identifying a physical server in the computer system.

The speed 22003 stores a value indicating the speed of data transfer occurring when a VM is migrated from the source physical server ID 22001 to the target physical server ID 22002.

As stated previously, this information is gathered by the VM configuration information gathering program 15001 from the agent 14012.

FIG. 23 is a diagram showing the flow of processing carried out when the configuration construction program 4010 constructs a disaster recovery configuration according to the present embodiment. This processing is premised on the creation of a remote copying configuration for the logical volume managed by the hypervisor.

Firstly, the configuration construction program 4010 receives conditions from a user by means of the input device (step 23010). These conditions are: (a) ID of virtual server, (b) capacity of virtual volume, (c) normal required performance, (d) required performance for disaster, (e) tolerable performance deterioration time in event of disaster, (f) ID of site where application is run during normal operation, (g) ID of physical server where virtual server is operated normally and (h) ID of physical server where virtual server is operated in event of disaster.

Upon receiving this input from the user, the configuration construction program 4010 confirms the free capacity of the logical volume (step 23015). The configuration construction program 4010 searches the logical volumes managed by the physical server used normally as indicated by (g) on the basis of the physical server information 15005 and the logical volume information 4014, in order to find a logical volume which satisfies the free capacity indicated by (b). This logical volume is called a first logical volume. Furthermore, the storage system which stores the first logical volume is called a first storage system.

At step 23015, if there is no corresponding logical volume, the configuration construction program 4010 reports an error to the user via an output device and then terminates processing (step 23130).

If a corresponding logical volume is found at step 23015, then it is confirmed that the remaining capacity of the physical volume satisfying the performance indicated by (c) is equal to or greater than the capacity indicated by (b) (step 23020). This confirmation process involves checking whether the capacity in (b) is available in the pool of physical volumes which satisfy the performance in (c), in the storage system which stores the logical volume that has been found. This can be done by referring to the physical volume information 4015.

This judgment may also be implemented in a different mode, for instance, a mode where rather than checking for the capacity in (b), it is confirmed whether there is free capacity corresponding to the page allocated by a write operation which arises upon allocation of a virtual volume.

At step 23020, if the remaining capacity of the pool satisfying the performance in (c) is equal to or greater than the capacity in (b), then the program advances to step 23100. The configuration construction program 4010 identifies the logical volume forming a subsidiary logical volume in the pair in which the first logical volume is a main logical volume. It is confirmed whether there is a physical volume which satisfies the performance in (d) and has remaining capacity equal to or greater than the capacity in (b), in the second storage system which stores this subsidiary logical volume (step 23100).

As a further mode, it is also possible to confirm whether or not there is free capacity corresponding to a page which was allocated by a write operation arising when a volume was allocated to the virtual server. Below, the storage system storing the subsidiary logical volume is called the second storage system, and the identified logical volume is called the second logical volume.

At step 23100, if the second storage system does not include a pool satisfying the performance in (d) and having the free capacity in (b), then the configuration construction program 4010 reports an error to the user (step 23130) and terminates processing.

If, at step 23100, the second storage system does include a pool which satisfies the performance in (d) and has the free capacity in (b), then the configuration construction program 4010 creates a virtual volume file in the first logical volume and instructs the hypervisor running on (g) to allocate the virtual volume to the virtual server in (a). Furthermore, the configuration construction program 4010 also instructs the control program 2032 in the first storage system to allocate a physical page from a pool satisfying the performance in (c), to the logical page where the created virtual volume file is stored. Furthermore, the configuration construction program 4010 also instructs the control program 2032 of the second storage system to allocate a physical page from a pool satisfying the performance in (d), to the logical page corresponding to the second logical volume (step 23110).

Next, the configuration construction program 4010 sets (a) as the VM ID 16001, (c) as the normal required performance 5002, (d) as the required performance for disaster 5003, (e) as the tolerable performance deterioration time 5004, (f) as the site ID 5005, (g) as the normal physical server ID 16002 and (h) as the disaster physical server ID 16003. Furthermore, the configuration construction program 4010 updates the VM configuration information 15004 in accordance with the settings made (step 23120). The configuration construction program 4010 then terminates processing.

If there was not sufficient free capacity at step 23020, then the program searches the first storage system to find a pool having the free capacity in (d), on the basis of the physical volume information 4015 (step 23030).

If, at step 23030, a corresponding pool could not be found, then the configuration construction program 4010 reports an error to the user and terminates processing (step 23130).

If, at step 23030, a corresponding pool has been found, then the program advances to step 23040. In the description given below, the pool discovered in step 23030 is called the first alternative pool.

At step 23040, the configuration construction program 4010 searches for another pool from the first storage system, based on the conditions that a page of corresponding capacity to (b) has been allocated to the subsidiary logical volume, that the performance is better than the first alternative pool, and that the performance is nearest to (c) (step 23040). It is also possible to search for another pool from the first storage system, based on the conditions that a page of corresponding capacity to (b) has been allocated to the subsidiary logical volume, and that the page allocated to the subsidiary logical volume offers performance exceeding the performance in (c).

If, at step 23040, a corresponding pool has been found, then the program advances to step 23050. In the following description, the pool thus found is called a "second alternative pool". At step 23050, the configuration construction program 4010 performs a simulation of a processing flow which arises in the event of a disaster as shown in FIG. 25, based on the assumption that the data in the subsidiary logical volume to which the physical page of the second alternative pool has been allocated, is migrated, page-to-page, to the first alternative pool, the first alternative pool is associated with the subsidiary logical volume, and a virtual volume file as indicated in (a) is created in the free area obtained in the second alternative pool and this virtual volume file is associated with the main logical volume (step 23050).

In the simulation in FIG. 25, it is judged whether or not there is a case where an error notification 23150 becomes necessary in respect of the first alternative pool which is used as a subsidiary logical volume. If the error notification 12090 is necessary, then it is judged that restoration of performance in the event of disaster is impossible. Furthermore, if an error notification 12090 is not necessary and it is judged that restoration of performance in the event of disaster is possible, then the time period required to migrate the data to the first alternative pool in order to satisfy the disaster performance requirement is calculated. The calculated time period is taken as the performance deterioration time in the event of disaster. The performance deterioration time in the event of disaster can also be calculated on the basis of the volume of data stored in the first alternative pool and the data transfer speed in the data transfer performance information 4016.

Furthermore, if the first alternative pool and another pool are swapped in order to restore performance in the event of a disaster, then the performance deterioration time in the event of disaster can be calculated by also using the volume of data stored in the other pool, as well as the volume of data stored in the first alternative pool and the data transfer speed in the data transfer performance information 4016. More specifically, the sum of the time taken to migrate the data stored in the other pool and the time taken to migrate the data stored in the first alternative pool, to the other pool, gives the performance deterioration time in the event of disaster.

In the present embodiment, the method shown in FIG. 25 is used as an algorithm for rearranging volumes, but if volumes are rearranged using another algorithm, then the performance deterioration time must be calculated using a corresponding method.

A pool which is judged capable of restoring performance in the event of a disaster and which has a tolerable performance deterioration time exceeding the performance deterioration time is selected, from the first alternative pools. The selected pool is set as a new first alternative pool.

If, at step 23040, a corresponding pool could not be found, then the program skips step 23050.

Thereupon, the configuration construction program 4010 advances to step 23060. This process is the same as in step 9060. However, mentions of the application must be read as the virtual server.

Thereupon, the configuration construction program 4010 advances to step 23070. This process is the same as in step 9070. However, mentions of the application must be read as the virtual server.

If the input at step 23070 is a value indicating interruption of construction, then a notification that the construction has been interrupted is shown to the user (step 23130) and processing is terminated.

If the input at step 23070 is a value indicating the alternative configuration type 2, then the configuration construction program 4010 instructs the control program 2032 to transfer the data in the subsidiary logical volume to which the physical page of the second alternative pool has been allocated, page by page, to the first alternative pool (step 23090). By this means, it is possible to create a storage area for the virtual volume file used by the virtual server in (a), in the second alternative pool. Furthermore, the physical page of the first alternative pool to which the data of the subsidiary logical volume has been migrated is allocated to the subsidiary logical volume. Moreover, in the second alternative pool, the physical page storing the virtual volume file is allocated to the main logical volume.

If the input at step 23070 is a value indicating the alternative configuration type 1, then the configuration construction program 4010 skips step 23090.

Thereupon, the configuration construction program 4010 advances to step 23100. This step is as described previously.

Thereupon, the configuration construction program 4010 advances to step 23110. This step is as described above, and only the points of difference are described here. If the alternative configuration type 2 is selected, then the control program 2032 in the first storage system is instructed to allocate a physical page from the second alternative pool where the free area was created in step 23090, to the storage area of the created virtual volume file. If the alternative configuration type 1 has been selected, then the control program 2032 in the first storage system is instructed to allocate a physical page from the first alternative pool to the area where the created virtual volume is stored.

Thereupon, the configuration construction program 4010 advances to step 23120. This step is virtually the same as that described above, and therefore only the differences are explained here. The performance of the first alternative pool is set as the normal required performance 5002. The configuration construction program 4010 then terminates processing.

The foregoing was the flow of processing by the configuration construction program 1251.

FIG. 24 shows the flow of processing according to the present embodiment, whereby the operational status monitoring program 4011 monitors the state of access to a virtual volume during operation, and if the performance of the virtual volume is insufficient, migrates a physical page which has been allocated to the virtual volume, to the physical page of another pool, in accordance with an instruction from a user.

The operational status monitoring program 4011 is started up and continues running in the computer system as a daemon process. Thereupon, the operational status monitoring program 4011 waits for a prescribed time period. This prescribed time may be specified by the user or may be encoded in the program. Thereupon, the processing shown in FIG. 24 is carried out. After completing the processing in FIG. 24, the computer program waits again for a prescribed time period, and then repeats the processing in FIG. 24. The processing in FIG. 24 is described below.

The operational status monitoring program 4011 lists up the virtual severs in the computer system and repeats step 24030 to step 24130 in respect each of the identified virtual servers in sequence, one server at a time. Below, a virtual server that is the object of this processing is called an object virtual server.

Firstly, the operational status monitoring program 4011 acquires the access volume per unit time to the virtual volume of the object virtual server (step 24030). This value can be acquired from the hypervisor 14010.

Next, the operational status monitoring program 4011 judges whether there is a possibility that the acquired access volume per unit time will exceed the performance of the physical page allocated to the virtual volume (step 24040). The physical page allocated to the virtual volume means the physical page allocated to the logical volume which stores the virtual volume file. In the judgment made in this step, the access volume per unit time acquired at step 24030 is compared with a uniform threshold value which is set to be equal to or lower than the performance of the physical page, and if the access volume per unit time thus acquired has surpassed the threshold value, then it can judged that there is a possibility of exceeding the performance of the physical page. Furthermore, it is also possible to keep a history of values acquired at step 24030 and to judge whether there is a possibility of exceeding the performance on the basis of trend analysis.

If, as a result of the judgment in step 24040, it is judged that there is no possibility of exceeding the performance of the physical page, then the operational status monitoring program 4011 transfers to step 24020, and transfers to processing in respect of the next virtual server.

If, as a result of the judgment in step 24040, it is judged that there is a possibility of exceeding the performance of the physical page, then the operational status monitoring program 4011 searches for a pool having free capacity corresponding to the capacity of the physical page allocated to the virtual volume of the object virtual server (step 24050). If there is no corresponding pool, then the operational status monitoring program 4011 sends a warning to the user indicating that there is a risk that the access volume will exceed the performance of the virtual volume of the object virtual server (step 24130), whereupon the program transfers to step 24020 and switches to processing in respect of the next virtual server.

If, as a result of the judgment in step 24050, a corresponding pool has been found, then the operational status monitoring program 4011 transfers to step 24060. The pool thus found is called a first alternative pool. At step 24060, the operational status monitoring program 4011 searches for a pool based on the conditions that: the performance is better than the physical page allocated to the virtual volume of the object virtual server, and that a physical page equal to or greater than the capacity of the physical page allocated to the virtual volume of the object virtual server is allocated to the other subsidiary logical volume (step 24060).

If, as a result of step 24060, there is no corresponding pool, then the operational status monitoring program 4011 sends a warning to the user indicating that there is a risk that the access volume will exceed the performance of the virtual volume of the object virtual server (step 24130), whereupon the program transfers to step 24020 and switches to processing in respect of the next virtual server.

If, as a result of step 24060, a corresponding volume has been found, then the operational status monitoring program 1252 advances to step 24065. In the following description, the pool thus found is called the "second alternative pool". At step 24065, it is judged whether or not a virtual data interface suited to the performance of the second alternative pool can be allocated to the object virtual server (step 24065).

Firstly, the performance of the data interface allocated to the object virtual server and the performance of the second alternative pool are compared. If the performance of the data interface is equal to or greater than the performance of the second alternative pool, then the operational status monitoring program 1252 advances to step 24070. If the performance of the data interface is lower than the performance of the second alternative pool, then the following processing is carried out.

The other virtual servers on the same physical server are identified on the basis of the VM performance information 15002. The sum total of the performance of the virtual data interfaces of the virtual servers other than the object virtual server is subtracted from the I/O performance 21002 of the physical server, to calculate the data interface performance which can be allocated to the object virtual server (the allocatable data interface performance). On the basis of the data interface performance thus calculated, it is judged whether it is possible to create a virtual data interface suited to the performance of the second alternative pool, on the physical server on which the object virtual server is run. For example, it is judged whether or not the data interface performance can be allocated in such a manner that the differential between the virtual data interface performance and the performance of the second alternative pool comes within a threshold value. If creation of a such virtual data interface is possible, then the performance of the virtual data interface which produces a differential within the aforementioned threshold value between the virtual data interface and the performance of the second alternative pool is calculated, and the operational status monitoring program 1252 then advances to step 24070.

If creation of such an interface is not possible, then the program searches for a physical server to which the virtual server can be migrated, from the VM migration performance information 15006. If there is a physical server to which the virtual server can be migrated, then the data interface performance which can be allocated is calculated on the basis of the VM performance information 15002 and the I/O performance 21002 of the physical server. It is judged whether or not it is possible to create a virtual data interface suited to the performance of the second alternative pool, in the physical server thus found. The method of judging whether or not a virtual data interface can be created is as described in step 24065. If such a virtual data interface can be created, then the performance of the virtual data interface is calculated in such a manner that the differential between the performance of the virtual data interface allocated from the physical server thus found and the performance of the second alternative pool comes within the aforementioned threshold value, and the operational status monitoring program 1252 then advances to step 24070. If the virtual data interface cannot be created, then the operational status monitoring program 4011 sends a warning to the user indicating that there is a risk that the access volume will exceed the performance of the virtual volume of the object virtual server (step 24130), whereupon the program transfers to step 24020 and switches to processing in respect of the next virtual server.

At step 24070, the configuration construction program 4010 performs a simulation of a processing flow which arises in the event of a disaster, based on the assumption that the data in the subsidiary logical volume to which the physical page of the second alternative pool has been allocated, is migrated, page-to-page, to the first alternative pool, and a virtual volume file as indicated in (a) is created in the free area obtained in the first alternative pool (step 24070). If it is judged at step 24065 that the virtual server needs to be migrated, then the assumption that the virtual server has also been migrated is added to the conditions of the simulation. By this means, it is determined whether or not the required performance is satisfied in the event of disaster, and the performance deterioration time in the event of disaster is found.

The processing details of the simulation follow the method of the disaster recovery processing indicated in the description of FIG. 25. The method of calculating the performance deterioration time in the event of disaster is as described in reference to FIG. 23. The processing time of the page-to-page data migration is required as a parameter for calculating the performance deterioration time in the event of disaster, and this can be calculated by firstly acquiring the capacity of the pages allocated to the virtual volume files of the respective virtual servers, from the logical volume address 20006 and the logical volume configuration information 15003, and then dividing by the data copying performance 4016. Furthermore, similarly, the subsequent processing time of the virtual server is also required, but this can be calculated by firstly taking the allocated memory volume 20002 which has been allocated to the virtual server, and dividing by the speed 22003, which is the data transfer speed between physical servers (step 24070).

As a result of the simulation in step 24070, it is judged whether or not restoration of performance is possible in the event of a disaster (step 24075), and if this is judged to be impossible, then a warning is reported to the user (step 24130), and the procedure transfers to step 24020 and switches to processing in respect of the next virtual server.

Thereupon, the operating status monitoring program 4011 presents an alternative configuration to the user (step 24080). Here, only one type of alternative configuration is displayed. In this configuration, the data in the subsidiary logical volume using the second alternative pool is migrated to the first alternative pool, and the virtual volume file of the object virtual server is migrated from the pool currently in use to the second alternative pool. The user can choose one of two processing options: either to select this configuration or to continue with the current configuration. The composition of this screen is the same as that in FIG. 10, apart from the fact that the options are changed to the two options stated above, and therefore this screen in not shown in the drawings.

A user input is received via the screen displayed in step 24080 (step 24090).

If the user chooses to continue with the current configuration at step 24090, then the operational status monitoring program 4011 sends a warning to the user indicating that there is a risk that the access volume will exceed the performance of the object virtual volume (step 24130), whereupon the program transfers to step 24020 and switches to judgment in relation to the next main logical volume.

If the user has chosen to change to the alternative configuration at step 24090, then the operational status monitoring program 4011 instructs the control program 2032 to migrate the subsidiary logical volume in the second alternative pool to the first alternative pool, and to migrate the virtual volume file in the object virtual server from the current pool to the second alternative pool. (step 24100). Furthermore, at step 24065, if it is necessary to re-allocate the virtual data interface, then the program instructs the hypervisor 14010 to carry out re-allocation of the virtual data interface. Furthermore, in a similar fashion, if it is necessary to migrate the virtual server between physical servers, then the program instructs the hypervisor 14010 to migrate the virtual server and allocate the virtual data interface to the physical server which is the destination of the migration.

Finally, the operational status monitoring program 4011 updates the VM performance information 15002, the logical volume configuration information 15003 and the VM configuration information 15004 in accordance with the settings made (step 24110). The configuration construction program 4011 then returns to step 24020 and continues processing in respect of the next main logical volume.

When the processing from step 24030 to step 24130 has been completed in respect of all of the virtual servers, the operational status monitoring program 4011 returns to step 24010.

The foregoing was the flow of processing by the operational status monitoring program 4011. It is judged whether or not to migrate a virtual server on the basis of whether the performance of the virtual data interface will be sufficient in respect of the virtual volume performance after migration, but apart from this it is also possible to take consideration of whether the CPU, memory, or the like, will be sufficient.

FIG. 25 is a diagram showing the flow of processing carried out by the disaster recovery program 4012 to re-allocate volumes having the performance required by the respective virtual servers in the event of a disaster.

The disaster recovery program 4012 is started up in the event of a disaster in one site, taking as a parameter the site ID of the site which has not suffered a disaster. When started up, the disaster recovery program 4012 sorts the applications in accordance with the performance required of the virtual volume by the virtual server, in sequence starting from the highest required performance (step 25010). In this sorting process, the site ID input as a parameter and the site ID 5005 are compared, and in the case of a virtual server for which these IDs are matching, the normal required performance 5002 is set as the required performance, while in the case of a virtual server for which the IDs are not matching, the required performance for disaster 5003 is set as the required performance. An application in which the site ID input as a parameter and the site ID 5005 are matching is an application which was using the site not suffering a disaster as a main site, before the occurrence of a disaster in the one site. An application in which the site ID input as a parameter and the site ID 5005 are not matching is an application which was using the site not suffering a disaster as a subsidiary site, before the occurrence of a disaster in the one site.

Thereupon, the disaster recovery program 4012 repeats the processing from step 25030 to step 25070 in respect of the each of the virtual servers, one by one, in order starting from the highest required performance. Below, a virtual server that is the object of this processing is called an object virtual server.

Firstly, the disaster recovery program 4012 compares the required performance used in step 25010 with the performance of the physical page allocated to the logical volume which stores the virtual volume file of the virtual server (step 25020). If the required performed is satisfied, then the disaster recovery program 4012 returns to step 25020 and continues processing in respect of the next virtual server. If the required performance is not satisfied, then the program searches for a pool which satisfies the required performance (step 25040). The conditions for this search process are that the pool must satisfy the required performance and that the total capacity of the physical pages allocated to the logical volume storing the virtual volume file of a virtual server having lower required performance than the object virtual server must be greater than the capacity of the virtual volume of the object virtual server.

If, as a result of step 25040, it has not been possible to find a corresponding pool, then an error is reported to the user (step 25090), followed by abnormal termination.

If, as a result of step 25040, it has been possible to find a corresponding pool, then the disaster recovery program 4012 advances to step 25050. The pool thus found is called a first alternative pool, below. At step 25050, the disaster recovery program 4012 searches for a pool other than the first alternative pool which has free capacity of the same size as the virtual volume of the object virtual server (step 25050). If, as a result of this search, it has not been possible to find a corresponding pool, then an error is reported to the user (step 25090), followed by abnormal termination.

If a corresponding pool has been found as a result of step 25050, then the program advances to step 25060. The pool thus found is called a second alternative pool, below. In step 25060, the disaster recovery program 4012 issues an instruction to migrate the data of the virtual volume file of the virtual server having a lower required performance than the object virtual server, from the first alternative pool to the second alternative pool. The disaster recovery program 4012 then instructs the control program 2032 to migrate the data of the virtual volume file of the object virtual server, from the current pool to the first alternative pool (step 25060).

Furthermore, it is confirmed whether or not the physical server on which the object virtual server is running is the designated physical server, and if it is different, then the virtual server is migrated to the designated physical server. This confirmation checks that the object virtual server is running on the physical server indicated by the normal physical server ID 16002, if the site ID given as a startup parameter matches with the site ID 5005. If these IDs are not matching, then it is checked that the object virtual server is running on the physical server indicated by the disaster physical server ID 16003. Furthermore, a virtual data interface having performance suited to the performance of the newly allocated physical page is allocated.

Finally, the disaster recovery program 4012 updates the VM performance information 15002, the logical volume configuration information 15003 and the VM configuration information 15004 in accordance with the settings made (step 25070).

The foregoing was the flow of processing performed by the disaster recovery program 4012.

In the present processing, it is assumed that there is no free capacity in a high-performance pool, but in some cases, it is desirable to migrate a virtual volume to free capacity in a high-performance pool. The foregoing was a description of a second embodiment of the present invention.

According to the present embodiment, in an active-active disaster recovery configuration in a virtual server environment, when returning the system to an original state within a tolerable performance deterioration time in the event of a disaster, it is possible to make use of the performance of volumes which were not being utilized fully due to bottlenecking in the virtual data interfaces, by allocating virtual data interfaces in accordance with change in the performance of the virtual volumes in the virtual servers, and therefore the usage rate of the whole storage system can be improved.

What is claimed is:

1. A computer system, comprising:
   a storage system which is coupled to another storage system; and
   a management computer which manages the storage system, wherein
   the storage system comprises:
   a plurality of physical volumes corresponding to a plurality of logical volumes including a first main logical volume, a plurality of first subsidiary logical volumes and a buffer volume; and
   a first controller which executes data input/output processing to and from the plurality of physical volumes,
   the management computer comprises:
   a memory which stores physical volume information indicating performance of the plurality of physical volumes; and
   a second controller,
   the plurality of first subsidiary logical volumes form copy pairs with a plurality of second main logical volumes provided by the other storage system, and the first main logical volume forms a copy pair with a second subsidiary logical volume provided by the other storage system,
   when an access volume to the first main logical volume exceeds a threshold value, the second controller selects a subsidiary logical volume which is included in the plurality of first subsidiary logical volumes, and which is associated with a second physical volume having higher input/output performance than a first physical volume associated with the first main logical volume, by referring to the physical volume information read out from the memory, and
   the second controller confirms whether data migration time is within a prescribed time period, and when the migration time is within the prescribed time period, instructs the storage system to migrate data stored in the second physical volume corresponding to the selected subsidiary logical volume to a third physical volume which corresponds to the buffer volume, and to migrate data stored in the first physical volume corresponding to the first main logical volume to the second physical volume corresponding to the selected subsidiary logical volume, and to associate the second physical volume corresponding to the selected subsidiary logical volume with the first main logical volume.

2. The computer system according to claim 1, wherein the data migration time is time required, in a case where the data stored in the second physical volume corresponding to the selected subsidiary logical volume is migrated to the third physical volume corresponding to the buffer volume, in order to migrate the data stored in the third physical volume corresponding to the buffer volume to a fourth physical volume having higher input/output performance than the third physical volume corresponding to the buffer volume.

3. The computer system according to claim 2, wherein
   the memory further stores data migration performance information which indicates a data migration speed for migrating the data stored in one physical volume included in the plurality of physical volumes in the storage system, to another physical volume, and
   the second controller calculates the data migration time further on the basis of the volume of data stored in the second physical volume and the data migration speed, by referring to the data migration information.

4. The computer system according to claim 3, wherein the second controller calculates the data migration time on the basis of the volume of data stored in the fourth physical volume, as well as the volume of data stored in the second physical volume and the data migration speed.

5. The computer system according to claim 4, wherein the migration time is a sum of a first migration time calculated on the basis of the volume of data stored in the second physical volume and the data migration speed, and a second migration time calculated on the basis of the volume of data stored in the fourth physical volume and the data migration speed.

6. The computer system according to claim 5, further comprising:
   a host computer which is coupled to the storage system, and which runs a plurality of applications, wherein
   the plurality of logical volumes are allocated to the plurality of applications, respectively.

7. The computer system according to claim 6, wherein
   the memory further stores performance information indicating required performance for disaster which is required, in an event of disaster in the other storage system, by the applications to which the plurality of first subsidiary logical volumes are allocated, and
   the input/output performance of the fourth physical volume is higher than the required performance for disaster of the application allocated to the selected subsidiary logical volume.

8. The computer system according to claim 7, wherein the prescribed time is time at which permission is granted to allocate, to the selected subsidiary logical volume, a physical volume having lower input/output performance than the required performance for disaster of the application allocated to the selected subsidiary logical volume, in the event of a disaster in the other storage system.

9. The computer system according to claim 5, further comprising:
a physical server, which is coupled to the storage system, and on which a plurality of virtual servers are run, wherein
respective virtual volume files of the plurality of virtual computers are stored in the plurality of logical volumes.

10. The computer system according to claim 9, wherein
the physical server comprises an interface,
the memory stores virtual computer information indicating the input/output performance of the interface allocated to the plurality of virtual computers, and
the second controller refers to the virtual computer information, compares the input/output performance of the second physical volume with the input/output performance of the interface allocated to a first virtual computer which stores a virtual volume file in a main logical volume, and when the input/output performance of the interface allocated to the first virtual computer is lower than the input/output performance of the second physical volume, changes the input/output performance of the interface allocated to the first virtual computer when the second physical volume is associated with the main logical volume.

11. The computer system according to claim 10, wherein, when the input/output performance of the interface allocated to the first virtual computer cannot be made higher than the input/output performance of the second physical volume by changing the input/output performance of the interface allocated to the first virtual computer, then the first virtual computer is migrated to a physical server other than the physical server.

12. The computer system according to claim 11, wherein
the memory further stores performance information indicating the required performance for disaster which is required, in an event of disaster in the other storage system, by a virtual computer which stores a virtual volume file in the selected subsidiary logical volume, and
the input/output performance of the fourth physical volume is higher than the required performance for disaster of the second virtual computer.

13. The computer system according to claim 12, wherein the prescribed time is time at which permission is granted to allocate, to the selected subsidiary logical volume, a physical volume having lower input/output performance than the required performance for disaster that is required by the virtual computer.

14. A physical volume allocation method for a computer system having: a storage system which configured of a plurality of physical volumes corresponding to a plurality of logical volumes including a first main logical volume, a plurality of first subsidiary logical volumes and a buffer volume, and a first controller which executes data input/output processing to and from the plurality of physical volumes, and which is coupled to another storage system; and a management computer which is configured of a memory which stores physical volume information indicating the performance of the plurality of physical volumes and a second controller, and which manages the storage system, wherein
the plurality of first subsidiary logical volumes form copy pairs with a plurality of second main logical volumes provided by the other storage system,
the first main logical volume forms a copy pair with a second subsidiary logical volume provided by the other storage system,
when an access volume to the first main logical volume exceeds a threshold value, the second controller selects a subsidiary logical volume which is included in the plurality of first subsidiary logical volumes, and which is associated with a second physical volume having higher input/output performance than a first physical volume associated with the first main logical volume, by referring to the physical volume information read out from the memory, and
the second controller confirms whether data migration time is within a prescribed time period, and when the migration time is within the prescribed time period, instructs the storage system to migrate data stored in the second physical volume corresponding to the selected subsidiary logical volume to a third physical volume which corresponds to the buffer volume, and to migrate data stored in the first physical volume corresponding to the first main logical volume to the second physical volume corresponding to the selected subsidiary logical volume, and to associate the second physical volume corresponding to the selected subsidiary logical volume with the first main logical volume.

15. The physical volume allocation method according to claim 14, wherein the data migration time is time required, in a case where the data stored in the second physical volume corresponding to the selected subsidiary logical volume is migrated to the third physical volume corresponding to the buffer volume, in order to migrate the data stored in the third physical volume corresponding to the buffer volume to a fourth physical volume having higher input/output performance than the third physical volume corresponding to the buffer volume.

* * * * *